(12) United States Patent
Ricci Moretti et al.

(10) Patent No.: US 11,851,172 B1
(45) Date of Patent: Dec. 26, 2023

(54) APPARATUS, SYSTEM AND METHOD FOR A SUPPLEMENTAL WING FOR A ROTARY WING AIRCRAFT

(71) Applicant: Piasecki Aircraft Corporation, Essington, PA (US)

(72) Inventors: Luigi U. Ricci Moretti, Swarthmore, PA (US); Frederick W. Piasecki, Haverford, PA (US); Robert H. Lewis, Wynnewood, PA (US); Dinesh Barwey, Chandler, AZ (US)

(73) Assignee: Piasecki Aircraft Corporation, Essington, PA (US)

( * ) Notice: Subject to any disclaimer, the term of this patent is extended or adjusted under 35 U.S.C. 154(b) by 246 days.

(21) Appl. No.: 17/334,713

(22) Filed: May 29, 2021

Related U.S. Application Data

(60) Provisional application No. 63/032,674, filed on May 31, 2020, provisional application No. 63/032,574, filed on May 30, 2020.

(51) Int. Cl.
    *B64C 27/26*      (2006.01)
    *B64C 13/16*      (2006.01)
    (Continued)

(52) U.S. Cl.
    CPC .............. *B64C 27/26* (2013.01); *B64C 3/385* (2013.01); *B64C 9/10* (2013.01); *B64C 9/30* (2013.01);
    (Continued)

(58) Field of Classification Search
    CPC ................................. B64C 27/26; B64C 3/385
    See application file for complete search history.

(56) References Cited

U.S. PATENT DOCUMENTS

| | | | | | |
|---|---|---|---|---|---|
| 1,822,179 | A | * | 9/1931 | Thomas | B64C 27/00 244/6 |
| 2,959,373 | A | * | 11/1960 | Zuck | B64C 27/30 244/7 C |

(Continued)

FOREIGN PATENT DOCUMENTS

| | | |
|---|---|---|
| AT | 515456 B1 | 4/2018 |
| EP | 3650341 B1 | 3/2021 |

OTHER PUBLICATIONS

Julian Roche, "Aerodynamic Trade Study of Compound Helicopter Concepts," Embry-Riddle Aeronautical University, Dec. 2015, thesis accessed from Scholarly Commons.

*Primary Examiner* — Philip J Bonzell
*Assistant Examiner* — Michael B. Kreiner
(74) *Attorney, Agent, or Firm* — Weinberger & Husick; Robert J. Yarbrough

(57) ABSTRACT

A supplemental wing for a rotary wing aircraft rotates about a pitch axis between a forward flight position and a hover position. The supplemental wing generates lift and generates both positive and negative pitching moments that balance and that may passively rotate the supplemental wing to an equilibrium position. The supplemental wing may use power assist to overcome friction to move to the equilibrium position. The lift generated by the supplemental wing reduces at high forward speeds to preserve main rotor control authority. The supplemental wing rotates to avoid aft translation when in the hover position. The supplemental wing may be retrofitted to existing helicopters and flown using existing helicopter controls without pilot re-training.

20 Claims, 21 Drawing Sheets

(51) Int. Cl.
*B64C 9/30* (2006.01)
*B64C 13/48* (2006.01)
*B64C 9/10* (2006.01)
*B64C 3/38* (2006.01)

(52) U.S. Cl.
CPC .............. *B64C 13/16* (2013.01); *B64C 13/48* (2013.01); *B64C 2211/00* (2013.01)

(56) References Cited

U.S. PATENT DOCUMENTS

| | | | | |
|---|---|---|---|---|
| 3,666,209 A * | 5/1972 | Taylor | ................. | B64C 29/0033 244/12.4 |
| 4,124,180 A * | 11/1978 | Wolowicz | ................. | B64C 9/10 244/82 |
| 4,928,907 A * | 5/1990 | Zuck | ....................... | B64C 27/26 244/6 |
| 5,509,623 A * | 4/1996 | Schmittle | ................. | B64C 3/385 244/113 |
| 7,438,259 B1 * | 10/2008 | Piasecki | .................. | B64C 27/26 244/175 |
| 7,584,923 B2 * | 9/2009 | Burrage | ............... | B64C 29/0033 244/17.23 |
| 7,600,711 B1 * | 10/2009 | Nyhus | ................. | F16L 27/1012 244/6 |
| 8,403,255 B2 * | 3/2013 | Piasecki | .................. | B64C 3/385 244/6 |
| 9,266,607 B2 | 2/2016 | Fink | | |
| 9,527,577 B2 * | 12/2016 | Embacher | ............... | B64C 3/385 |
| 10,889,369 B2 * | 1/2021 | Decker | .................. | B64C 13/16 |
| 2006/0157614 A1 * | 7/2006 | Simpson | ................. | B64C 3/385 244/6 |
| 2008/0230656 A1 * | 9/2008 | Kretchmer | .............. | B64C 27/26 244/7 R |
| 2008/0272244 A1 * | 11/2008 | Bjornenak | ............... | B64C 27/30 244/7 R |
| 2009/0250548 A1 * | 10/2009 | Nyhus | .................... | B64C 3/385 244/6 |
| 2010/0230547 A1 | 9/2010 | Tayman | | |
| 2019/0329862 A1 * | 10/2019 | Theurich | ................. | B64C 13/02 |
| 2020/0031462 A1 * | 1/2020 | Svoboda, Jr. | ........... | B64C 27/30 |
| 2021/0047022 A1 * | 2/2021 | Robertson | ........... | B64C 29/0025 |

* cited by examiner

APPARATUS, SYSTEM AND METHOD FOR A SUPPLEMENTAL WING FOR A ROTARY WING AIRCRAFT

I. BACKGROUND OF THE INVENTION

A. Field of the Invention

The invention is a supplemental wing and related systems to provide additional lift and more efficient operation to a rotary wing aircraft. The supplemental wing may rotate about its span axis without pilot input between a hover position, a flight position, and intermediate positions. The supplemental wing automatically adjusts its pitch to maintain main rotor control authority at high forward speeds and to avoid translation in the aft direction when the supplemental wing is in the hover position. The supplemental wing may include a power assist system and may be retrofitted to existing helicopters without additional training of the helicopter pilot or of a flight control system.

B. Statement of the Related Art

As used in this document, the term 'rotary wing aircraft' means a Vertical Take Off and Landing (VTOL) rotorcraft having any configuration, including without limitation a helicopter having a main rotor and tail rotor, a tandem rotorcraft, a transverse rotorcraft, a coaxial rotorcraft, a synchropter, a multiple-rotor rotorcraft, and a compound aircraft.

A 'compound aircraft' is an aircraft that combines one or more rotors providing lift with a wing also providing lift. In prior art compound aircraft, all or substantially all of the lift required to support the aircraft in high-speed cruising flight may be transferred from the rotor to the wing. The rotor may then free-wheel or otherwise turn at a minimum speed required to maintain rotor stability and at the rotor blade pitch corresponding to minimum drag. The rotor of a prior art compound aircraft loses control authority in high-speed cruising flight when the wing provides all or substantially all of the lift to keep the aircraft airborne. Control over the prior art compound aircraft must be provided by systems other than the main rotor, such as by flaperons on the wings or a rudder and elevator on the tail boom operated by the aircraft control system. The pilot knowledge and skill required to fly a prior art compound aircraft is different from the knowledge and skill required to fly a prior art helicopter.

Because of the lack of rotor control authority at cruising speeds and because of the different pilotage skill involved, a wing cannot be added to a prior art helicopter to create a successful compound aircraft without substantial modifications to the aircraft control systems and re-training of the pilot or automated control system.

The prior art does not teach the Invention.

II. SUMMARY OF THE INVENTION

The supplemental wing of the Invention includes opposing port and starboard wing portions that are rigidly joined by a wing spar. The span axis of the supplemental wing extends through the port and starboard sides of the rotary wing aircraft generally normal to the longitudinal axis of the aircraft. The wing spar is attached to the rotary wing aircraft by one or more bearings. The wing spar and the attached port and starboard wing portions are configured for rotation about a pitch axis defined by the bearings and the wing spar between a hover position and a forward flight position. In the hover position and with the aircraft in hover, the chord of the wing portions is oriented in a generally vertical direction and generally normal to the rotary wing aircraft longitudinal axis and parallel to the rotor axis of rotation. In the forward flight position, the chord of the wing portions is oriented generally normal to the rotor axis of rotation and parallel to the rotary wing aircraft longitudinal axis. When the supplemental wing is attached, the rotary wing aircraft is a compound aircraft.

The wing portions and wing spar are free to rotate between the hover and forward flight positions in response to external moments, such as relative wind blowing against or over the wing. The center of gravity of the spar and wing portions may be coincident with the pitch axis so that the wing spar and wing portions are statically balanced and thus the weight of the wing spar and wing portions do not cause the wing spar and wing portions to rotate. The center of lift, also referred to herein as the 'aerodynamic center,' of the wing portions corresponds to the center of gravity of the rotary wing aircraft so that any pitching moment applied to the rotary wing aircraft by the lift from the wing portions can be overcome by the control authority of the rotor(s).

The wing portions are stable in pitch and generate lift in response to the relative wind in a manner similar to that of a straight (rather than swept) flying wing; namely:

(a) the port and starboard wing portions and wing spar are configured so that the center of lift is disposed aft of the pitch axis. Lift due to relative wind therefore results in a negative pitching moment urging the port and starboard wing portions to pitch downward.

(b) the airfoil of the port and starboard wing portions is configured to generate a positive pitching moment. For example, the shape of the airfoil may be a reflex camber airfoil, but any other shape of airfoil or control surface that generates a positive pitching moment may be suitable.

The port and starboard wing portions are configured so that the negative and positive pitching moments balance. The result is that the wing portions are stable in pitch and generate lift in response to a relative wind blowing across the wing portions while moving passively between the hover and forward flight positions in response to the change in relative wind direction.

The airfoil configuration of the port and starboard wing portions may or may not be uniform for the length of the wing portion from root to tip. For example, the wing portions may define reflex camber airfoils proximal to the wing roots and non-reflex camber airfoils proximal to the wing tips. Any configuration of the wing portions may be suitable, provided that the net positive pitching moment of the wing portions due to that configuration will balance the net negative pitching moment due to lift.

The rotation of the wing spar and port and starboard wing portions about the pitch axis may be modulated by dampers, such as hydraulic, pneumatic or friction dampers, to prevent oscillations and unexpected accelerations due to, for example, gusts or other perturbations of the wing portions.

The rotary wing aircraft of the invention maintains the control authority of the main rotor throughout the aircraft flight envelope by limiting the lift generated by the supplemental wing at high forward speeds. As a result, the rotor controls of collective and cyclic pitch exert adequate control authority to allow a pilot or control system to control the aircraft. The rotary wing aircraft may limit high speed lift through a trim control surface that is either mechanically or electronically controlled, or by the configuration of supplemental wing, or by a combination of these strategies.

The port and starboard wing portions each may include a trim control surface located at the trailing edge of the airfoil. When aircraft exceeds an airspeed corresponding to the design maximum lift of the wing portions, the trim control system deflects the trim control surface in the downward direction, reducing the positive pitching moment and causing the wing portions to pitch downward, reducing the lift. The degree of negative deflection of the trim control surface is based on airspeed—the higher the airspeed, the greater the downward deflection and hence the greater the lift reduction. The degree of lift reduction is selected so that that the rotor(s) maintain adequate control authority in collective and cyclic pitch to control the aircraft and so that the wing portions continue to provide the design lift to the aircraft.

The position of the trim control surface may be controlled either mechanically or electronically. For a mechanical control system, a pitot tube and a static tube, preferably located on the wing portions, in combination detect the airspeed. The pitot-static tubes actuate a pneumatic relay. The pneumatic relay feeds air pressure from an air compressor to a pneumatic actuator, such as a pneumatic cylinder, that moves the trim control surface through a crank arm. For an electronic control system, an airspeed sensor, preferably located on the wing portions, detects the airspeed and informs a microprocessor. The microprocessor consults a trim control surface position schedule corresponding to the detected airspeed contained in computer memory or calculates a selected trim control surface position proportional to airspeed. The microprocessor instructs an actuator, such as a stepper motor, to move the trim control surface. The actuator moves the trim control surface to the selected position.

The trim control system may be configured for benign failure. If the mechanical control system fails, for example an air compressor failure, an orifice may be provided through which compressed air in the pneumatic actuator will slowly escape. The slow escape of the compressed air will cause a slow return of the trim control surface to its original position and a slow increase in lift from the wing portions. The control system may warn the pilot or aircraft control system of the failure, allowing the pilot or aircraft control system to slow the aircraft and to preserve the control authority of the rotor(s). The slow escape of compressed air also prevents sudden acceleration of the aircraft in the upward direction due to the sudden increase in lift from the wing portions. The electronic control system may include redundant control systems in the event of failure.

The configuration of the supplemental wing also may provide reduced lift at high speed by locating the pitch axis above the the aerodynamic center when the rotary wing aircraft is flying in the forward direction and the supplemental wing is in the forward flight position. The drag on the supplemental wing as the supplemental wing moves through the air applies a negative pitching moment to the supplemental wing, reducing the angle of attack and reducing the lift, with the degree of lift reduction increasing with increasing airspeed.

A de-pitching mechanism eliminates lift from the wing portions when the wing portions are in the hover position, which avoids lift pushing the rotary wing aircraft in the aft direction. Alternatively, spoilers or air dams may deploy in the hover position to eliminate lift.

When the rotary wing aircraft slows to a hover or to slow-speed flight, the downwash of the rotor(s) moves the port and starboard wing portions to the hover position and the rotational position of the port and starboard wing portions actuates the de-pitching mechanism. For example, the de-pitching actuator may be a stationary cam fixed to the rotary wing aircraft fuselage that moves a cam follower attached to the wing spar or port or starboard wing portions when the supplementary wing rotates to the hover position. The cam follower may deflect the trim control surfaces to reduce the angle of attack of the wing portions to the downwash from the rotor(s) to eliminate lift from the wing.

Alternatively, the cam follower may actuate air dams or spoilers located on the top surface of the wing portions. The air dams or spoilers trip the air flowing across the surface of the wing portions, resulting in turbulent flow across the wing portions and no lift.

For the electronic trim control system, a position sensor may detect that the wing portions are in the hover position and inform the microprocessor, which then instructs the stepper motors to move the trim control surfaces to reduce the angle of attack of the wing portions to eliminate lift.

The supplemental wing system of the invention may be a modular component of a modular rotary wing aircraft. The modular supplemental wing system may be added to or removed from the modular rotary wing aircraft as required by the aircraft mission. The Invention includes the modular rotary wing aircraft configured to receive the modular supplementary wing system. The rotary-wing aircraft of the invention, the modular rotary wing aircraft and retrofitted conventional helicopter all may be flown by a pilot or control system skilled in flying a conventional helicopter using the controls of the conventional helicopter and with little or no re-training.

Because the supplemental wing system of the invention is effectively independent of the rotary wing aircraft mechanical systems and aircraft control system, the supplemental wing system may be retrofitted to an existing helicopter without changing the aircraft mechanical systems or aircraft control system and without retraining the pilot. A pilot skilled in flying a conventional helicopter or an aircraft control system configured to fly a conventional helicopter may fly a rotary wing aircraft equipped with the supplementary wing system of the Invention without re-training and without experiencing additional pilot or aircraft control system workload.

The bearing within which the supplemental wing rotates will cause friction resisting the rotation of the supplemental wing in response to the positive and negative pitching moments. The friction may prevent the wing from passively rotating to the equilibrium position based on aerodynamic forces alone. To overcome the friction and to rotate the wing to the equilibrium position, the supplemental wing may include a power assist system. The power assist system detects the sum of the upward and downward pitching moments acting on the wing and provides supplemental torque to the wing in the same direction as the sum of the upward and downward pitching moments to overcome the friction of the bearings. Because the power assist system is assisting aerodynamic forces to rotate the wing, the power assist system need only apply enough torque to the wing to overcome friction. The force applied by the power assist system is small compared to a wing rotation system that is not supplementing aerodynamic forces.

The torque of the positive and negative pitching moments deforms the wing spar at the wing root in torsion. One or more strain gauges disposed on the wing spar at the wing root and on the wing side of the bearing detect the torsional deformation of the wing spar and hence the sum of the upward and downward pitching moments. The one or more strain gauges may be disposed on each of the port and starboard wings at the wing root and on the wing side of the bearing.

The one or more strain gauges are operably attached to a microprocessor that determines the direction and magnitude of the torsional deformation of the wing shaft, and hence the direction and magnitude of the sum of the upward and downward pitching moments acting on the wing. If the magnitude of the torsional deformation and hence the sum of the upward and downward pitching moments exceeds a predetermined minimum, the microprocessor directs a power assist actuator, such as an electrical, pneumatic or hydraulic actuator, to rotate the supplemental wing in the same direction as the sum of the positive and negative pitching moments. The microprocessor will continue to cause the power assist actuator to rotate the wing until the sum of the positive and negative pitching moments as detected by the strain gauges falls below the predetermined minimum.

The Invention offers advantages in helicopter operation, including reduction in vibration and an increase in efficiency. The primary source of vibration in the operation of helicopters is the main rotor. The partial offloading from the rotor to the supplementary wing can provide a reduction in the vibratory loads, with an associated reduction in the wear and tear of the dynamic components and the installed systems. The result is a reduction in maintenance costs. The improvement in aerodynamic efficiency associated with the rotor offloading in cruise allows for reduced energy consumption or greater cruising speed, with increases in operational flexibility, low operating costs and minimal additional crew training cost. The supplemental wing does not apply significant control moments to the rotary wing aircraft. This feature allows a pilot trained to fly conventional helicopters to fly the rotary wing aircraft of the Invention with little or no additional training and allows retrofit of the supplemental wing to pre-existing conventional helicopters.

III. BRIEF DESCRIPTION OF THE DRAWINGS

How the foregoing objects and advantages are secured together with others which will occur to those skilled in the art, will be more apparent from the following description referring to the accompanying drawings, in which.

IV. DESCRIPTION OF AN EMBODIMENT

Figure 1:
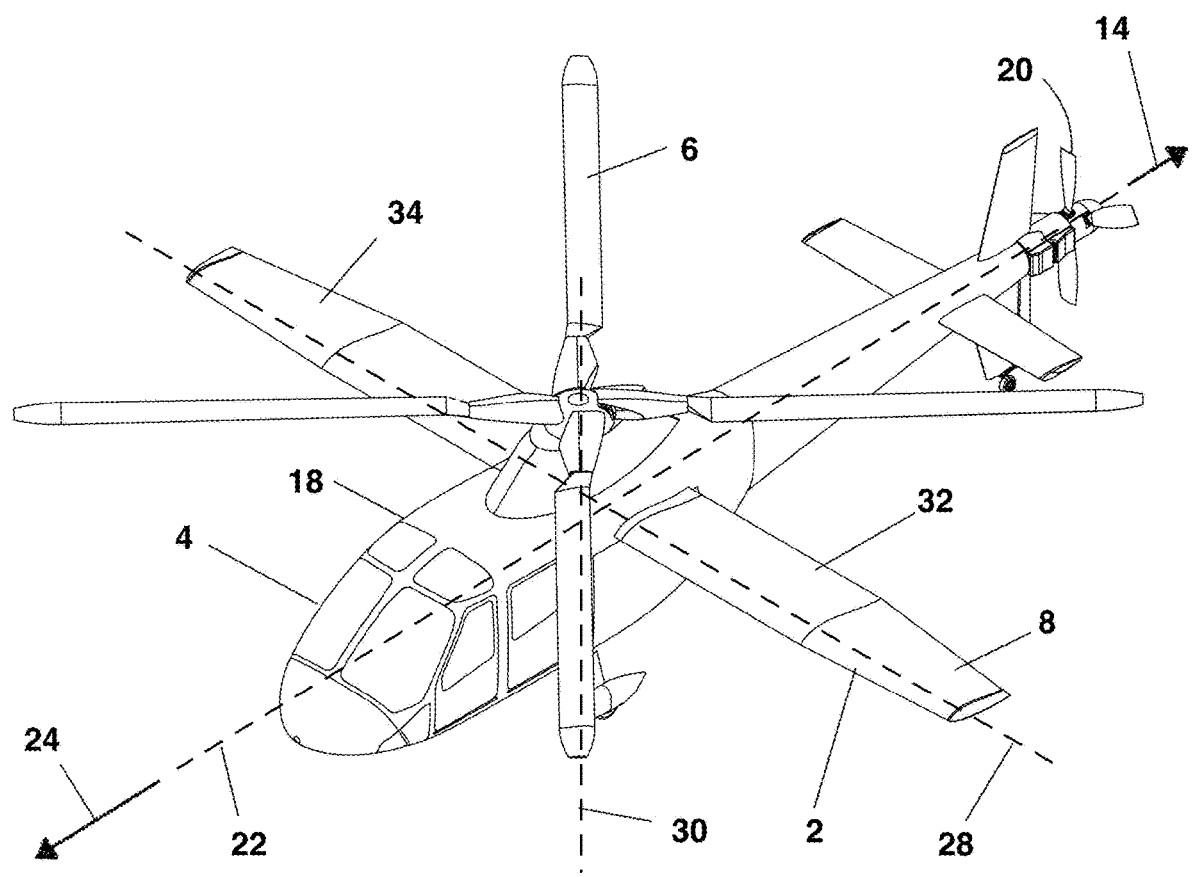
FIG. 1 shows a compound aircraft with a supplemental wing in the forward flight position.

The Invention is a supplemental wing 2 and related systems for a rotary wing aircraft 4. The supplemental wing 2 provides lift to supplement the lift provided by the main rotor 6 of a rotary wing aircraft 4 while preserving the control authority of the main rotor 6, all without pilot or control system input. The supplemental wing 2 of the invention may move between a forward flight position 8 and a hover position 10 either passively due to aerodynamic forces or with power assist and without pilot or control system input. The supplemental wing 2 also may adjust its pitch 12 without pilot or control system input to avoid translation in the aft direction 14 when the supplemental wing is in the hover position 10. The supplemental wing may be a component of a modular rotary wing aircraft 16 and may be retrofitted to a prior art helicopter without retraining of the helicopter pilot and without re-programming of a helicopter control system. Each of these points is discussed below.

Figure 2:
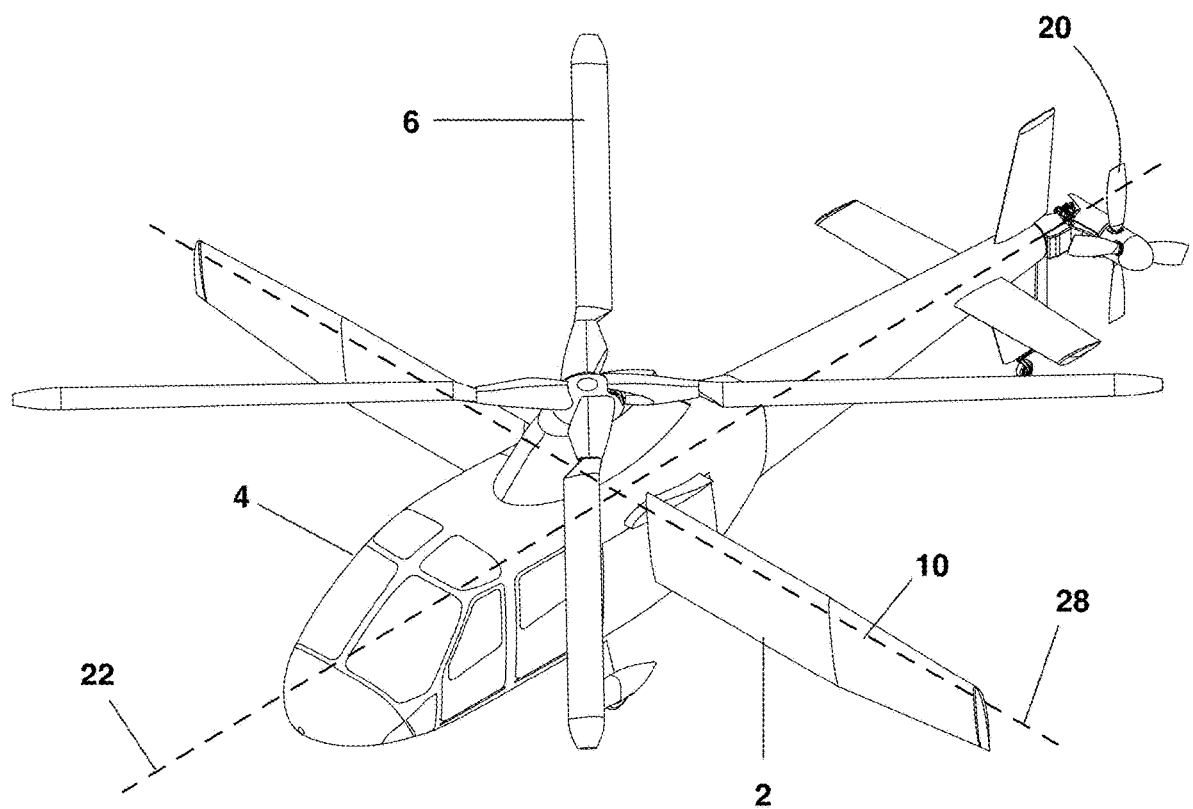
FIG. 2 is the compound aircraft of FIG. 1 with the wing in the hover position.

FIGS. 1 and 2 depict a rotary wing aircraft 4 with the supplemental wing 2 of the Invention. The rotary wing aircraft 4 has a main rotor 6 to provide lift to the aircraft 4, a fuselage 18 and a tail rotor 20. The fuselage 18 defines an aircraft longitudinal axis 22 and the aircraft longitudinal axis 22 defines a forward direction 24. In the example of FIGS. 1 and 2, the tail rotor 20 swivels to provide thrust in the forward direction 24, as shown by FIG. 1, or to balance the torque of the main rotor 6, as shown by FIG. 2. The Invention applies equally to any rotary wing aircraft 4, including aircraft 4 in which the tail rotor 20 does not swivel. A helicopter pilot or a helicopter control system may control the rotary wing aircraft 4 in the same manner that the pilot or control system would control a conventional helicopter; that is, by controlling the engine throttle, main rotor collective pitch, main rotor cyclic pitch, and tail rotor pitch.

The supplemental wing 2 shown by FIGS. 1 and 2 may passively rotate between a forward flight position 8, shown by FIG. 1, and a hover position 10, shown by FIG. 2. In the forward flight position 8, the supplemental wing 2 provides lift to supplement the lift of the main rotor 6 when the rotary wing aircraft 4 is flying in the forward direction 24. In the hover position 10, the supplemental wing 2 provides reduced drag from the downwash of the main rotor 6 when the rotary wing aircraft 4 is hovering or flying at low speed. The supplemental wing 2 may rotate to any position intermediate to the forward flight position 8 and the hover position 10 in response to the relative wind 26 passing over the supplemental wing 2.

As shown by FIGS. 1 and 2, the supplemental wing 2 rotates about a pitch axis 28 between the forward flight and hover positions 8, 10. The pitch axis 28 is substantially normal to the aircraft longitudinal axis 22 and is substantially normal to the main rotor axis of rotation 30.

While the figures show the supplemental wing 2 in the context of a rotary wing aircraft 4 having a single main rotor 6, the supplemental wing 2 has equal application for a tandem rotorcraft, a transverse rotorcraft, a coaxial rotorcraft, a synchropter, and a multiple-rotor rotorcraft.

Figure 3:
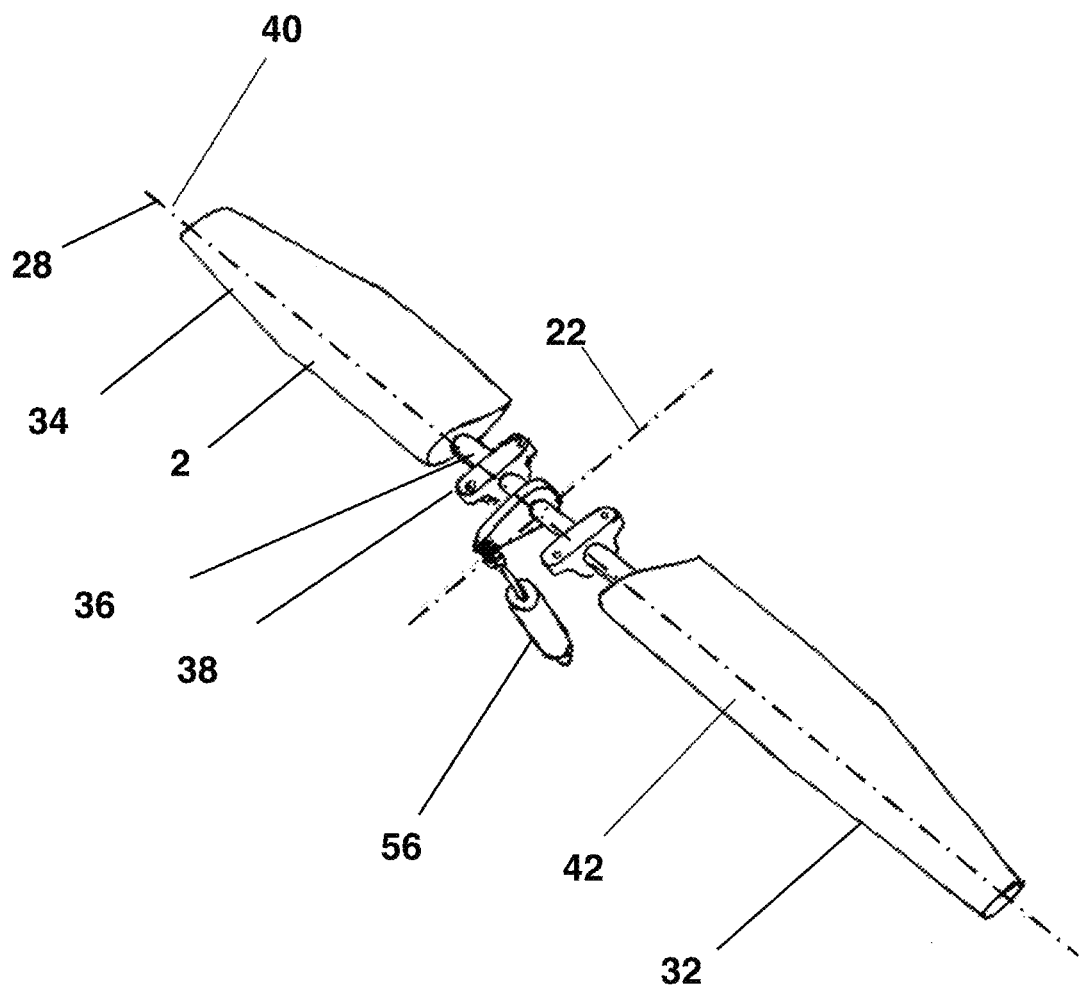
FIG. 3 shows the supplemental wing removed from the rotary wing aircraft.

FIG. 3 shows the supplemental wing 2 removed from the aircraft 4. The supplemental wing 2 has a port wing portion 32 and a starboard wing portion 34, each of which defines an airfoil 42. When installed on the rotary wing aircraft 4 and from FIGS. 1 and 2, the port wing portion 32 extends from the port side of the fuselage 18 and the starboard wing portion 34 extends from the starboard side of the fuselage 18. From FIG. 3, the port and starboard wing portions 32, 34 are joined by a wing spar 36 that is rotatably attached to the fuselage 18 by bearings 38. The bearings 38 may be of any suitable configuration, such as journal, ball, roller or air bearings 38. The wing spar 36 and bearings 38 define the pitch axis 28 about which the supplemental wing 4 may rotate between the forward flight position 8 and the hover position 10. The supplemental wing 2 defines a span axis 40 between opposing tips of the supplemental wing 2, the span axis 40 being substantially contiguous with the pitch axis 28. The supplemental wing 2 may include a damper 56 connected to the fuselage 18, such as a pneumatic, hydraulic or friction damper 56 to dampen oscillation of the supplemental wing 2. The supplemental wing may include a power assist system, discussed below with respect to FIG. 21, to assist in rotating the supplemental wing 2 between the forward flight and hovering positions 8, 10.

A. Generating Lift

Figure 4:
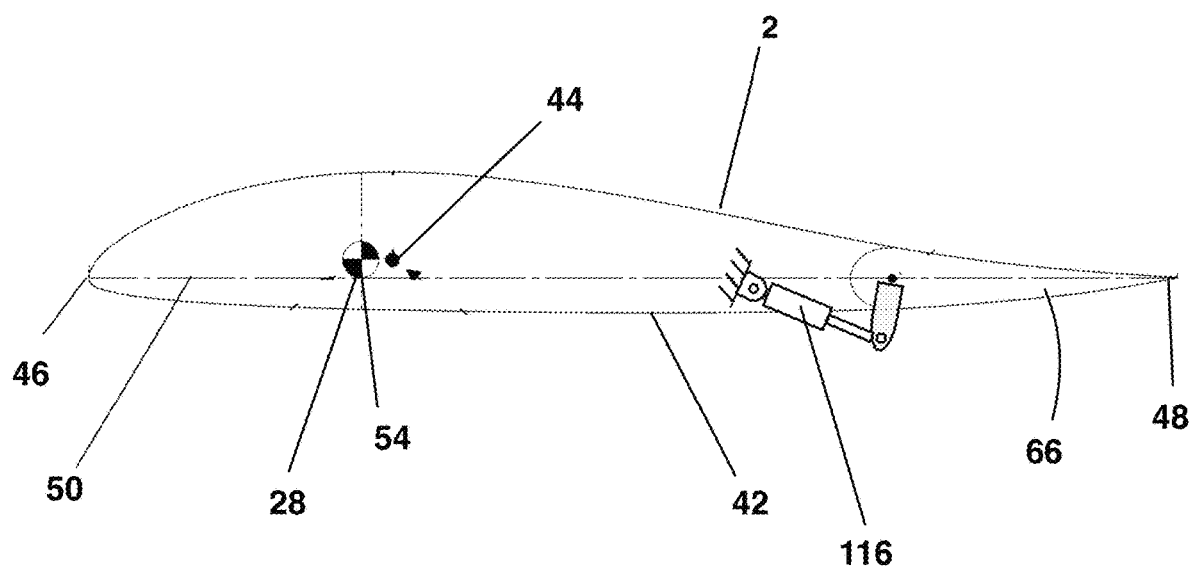
FIG. 4 is a cross section of the supplemental wing.

FIG. 4 is a cross section of the supplemental wing 2, showing that the supplemental wing 2 defines an airfoil 42. The airfoil 42 defines an aerodynamic center 44. The forces of lift and drag on the supplemental wing 2 act through the aerodynamic center 44. The supplemental wing 2 defines a leading edge 46 and a trailing edge 48 and a chord 50 between the leading and trailing edges 46, 48. When the supplemental wing 2 is in the forward flight position 8, the chord 50 is generally parallel to the aircraft longitudinal axis 22 and generally normal to the main rotor axis of rotation 30. When the supplemental wing 2 is in the hover position 10, the chord 50 is generally parallel to the main rotor axis of rotation 30 and generally normal to the aircraft longitudinal axis 22. As shown in FIG. 4, the center of gravity 54 of the supplement wing 2 may be coincident with the pitch axis 28 in order not to affect the static balance of the supplemental wing 2 and to avoid inertial coupling. The weight of the supplemental wing 2 does not cause the supplemental wing 2 to rotate about the pitch axis 28.

Figure 5:
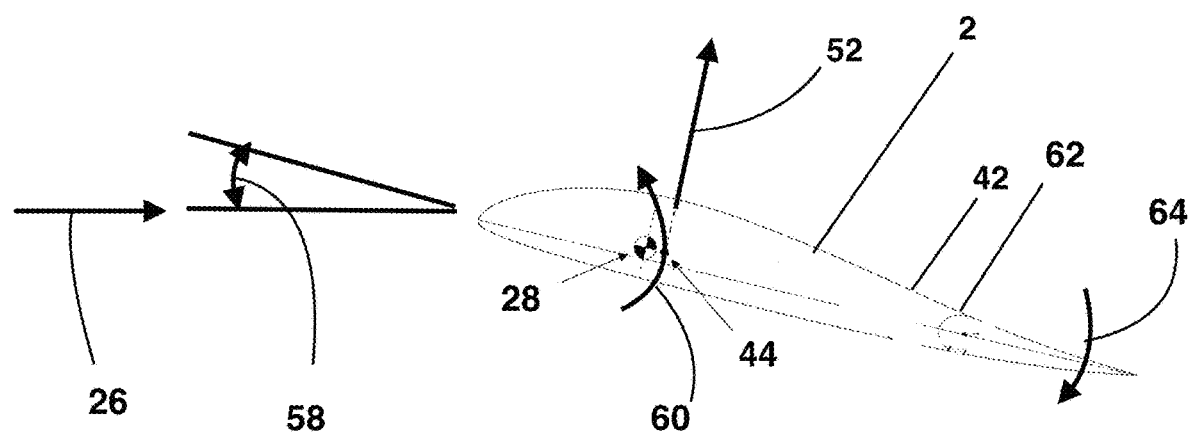
FIG. 5 is a cross section showing the aerodynamic forces acting on the supplemental wing.

FIG. 5 shows the aerodynamic forces acting on the supplemental wing 2 that cause the supplemental wing 2 to rotate passively between the forward flight and hover positions 8, 10 while generating lift 52. When relative wind 26 moves across the airfoil 44 at an angle of attack 58, the supplemental wing generates lift 52 acting through the aerodynamic center 44. Because the aerodynamic center 44 is located aft of the pitch axis 28, the lift 52 applies a moment, referred to herein as a negative pitching moment 60, to the supplemental wing 2 tending to rotate the wing 2 about the pitch axis 28 to decrease the angle of attack 26. The airfoil 42 may be a reflex camber airfoil 62. When the relative wind 26 moves across the reflex camber airfoil 62 at the angle of attack 58, the shape of the reflex camber airfoil 62 generates a positive pitching moment 64 about the supplemental wing pitch axis 28 tending to increase the angle of attack 58. If the positive pitching moment 64 increases the angle of attack 58, the lift 52 and hence the negative pitching moment 60 increases. The net result is that the airfoil 42 reaches a self-balancing equilibrium position with an equilibrium angle of attack 58 at which the positive pitching moment 64 caused by the shape of the airfoil 42 is equal to the negative pitching moment 60 caused by the lift 52. The supplemental wing 2 both passively rotates about the pitch axis 28 to the equilibrium position with the equilibrium angle of attack 58 and generates lift 52 in response to relative wind 26 passing over the supplemental wing 2.

The values of lift 52, drag and angle-of-attack 58 are determined by: 1) the type of airfoils 42 chosen, 2) by the relative chord-wise distance between the pitch axis 28 and aerodynamic centers 44 of the airfoils 42, 3) the relative thickness-wise distance between the pitch axis 28 and aerodynamic centers 44 of the airfoils 42, and 4) by the geometric parameters such as chord 50 lengths, span widths, and aerodynamic twist.

In particular, in order to generate positive (upward) lift 52 and static stability, the following relationship holds: $M=L*b$; where M is the overall wing pitching moment, considered a positive when increasing the angle of attack 58; L is the overall supplemental wing lift 52, applied to the mean aerodynamic center 44 and b is the distance between the pitch axis 28 and the aerodynamic center 44, considered positive when the pitch axis 28 is ahead of the aerodynamic center 44 in the forward direction 24, see FIG. 4. For a given supplemental wing 2 design the terms M and L are both proportional and uniquely affected by the dynamic pressure due to the relative wind 26 flowing on the supplemental wing 2. This means that, once the geometry of the supplemental wing 2 is defined with the choice of airfoil 42, planform and pitch axis 28 location, the angle of attack 58 is determined by the self-balancing nature of the aerodynamic forces and moments alone and therefore its coefficients of pitching moment CM and of lift CL are defined and the supplemental wing lift 52 will only be a function of the dynamic pressure. The positive pitching moment 64 may be applied by a flight control surface, such as a trim control surface 66, shown by FIG. 4, rather than by the shape of the reflex camber airfoil 62.

B. Damping the Rotation of the Wing

Figure 6:
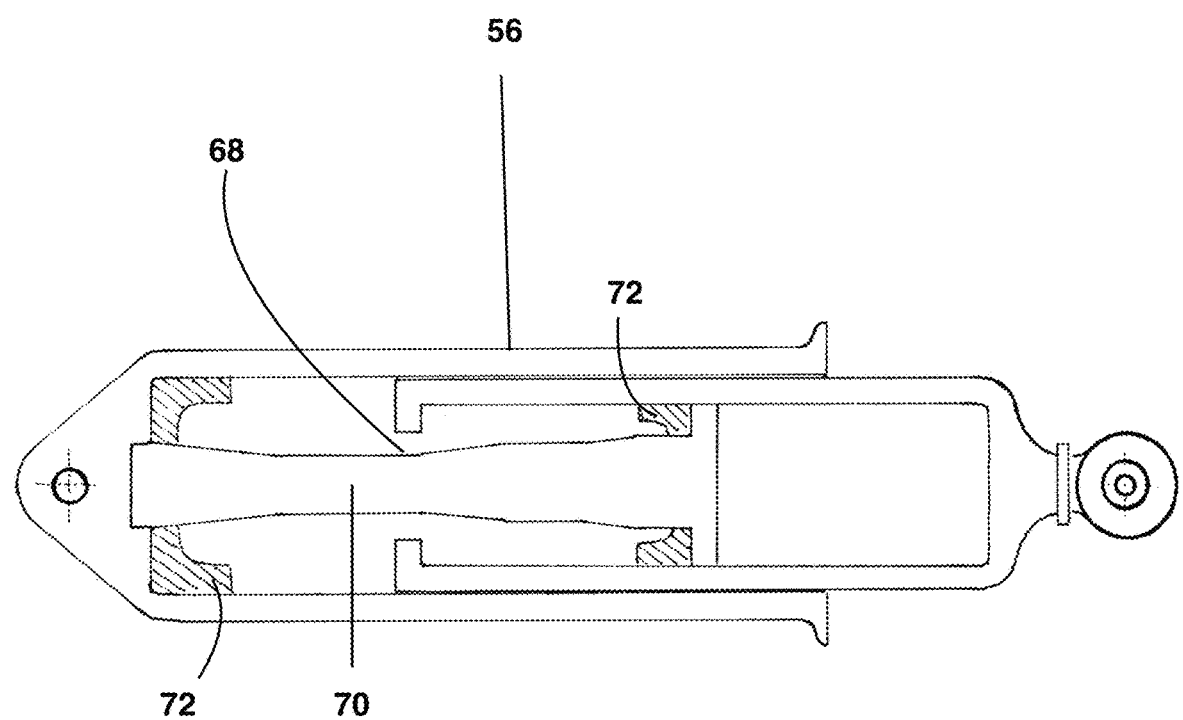
FIG. 6 is a cross section of a damper.

FIGS. 3 and 6 illustrate a damper 56 to prevent overly quick changes in the rotational position of the supplemental wing 2 about the pitch axis 28 and to prevent oscillation of the supplemental wing 2. FIG. 3 shows the damper 56 mounted to the supplemental wing 2 and fuselage 18. The supplemental wing 2 will see the downwash from the main rotor 6, the flow of air due to the airspeed of the rotary wing aircraft 4, and atmospheric turbulence. A rotary wing aircraft 4 also may experience autorotation in which the main dynamic pressure on the supplemental wing 2 is generated by the aircraft 4 descent rate. In autorotation, the negative pitching moment 60 on the supplemental wing 2 can be substantial. In the absence of a damper 56, the supplemental wing's pitch inertia, bearing 36 drag, and strength of the dynamic forces and moments 60, 64 affect the change in angle of attack 58. If the supplemental wing 2 has a low pitch inertia around the pitch axis 28 and the dynamic forces and moments 60, 64 are high, the rate at which the supplemental wing 2 angle of attack 58 changes will be rapid. A rapid change in supplemental wing 2 angle of attack 58 may pose safety and control problems for the pilot. If the change in the angle of attack 58 is too rapid, the pilot will experience a high rate of trim change and will need to manage the main rotor 6 cyclic and collective pitch. The damper 56 of FIGS. 3 and 6 effectively forces the supplemental wing 2 to slowly seek its equilibrium position during highly dynamic maneuvers, including autorotation.

FIG. 6 is a section side view of the damper 56. The damper 56 may use any technology for damping relative motion between two objects, including a pneumatic damper 56, a hydraulic damper 56 or a friction damper 56. The example of FIG. 6 is a pneumatic damper 56. The rate at which the damper 56 allows the angle of attack 58 to change is a function of the meter orifice 68 located inside the damper 56. The variable diameter control rod 70 allows the damper 56 to provide a variable force output. The variable diameter control rod 70 closes the meter orifice 68 as the damper 56 approaches its limits of travel to slow the rate of motion before impacting the elastomeric end stops 72.

C. De-Pitching to Maintain Main Rotor Authority

The supplemental wing 2 includes a configuration to reduce the pitch, and hence the angle of attack 58, of the supplemental wing 2 as the forward airspeed of the rotary wing aircraft increases and approaches a pre-determined de-pitching airspeed. The purpose is to limit the lift provided by the supplemental wing 2 at and above the pre-determined de-pitching speed to prevent lift 52 from the supplemental wing 2 depriving the main rotor 6 of control authority over the rotary wing aircraft 4. The configuration of the supplemental wing 2 may be mechanical, as by a pneumatic de-pitching system, may be electronic, or may be inherent in the design of the supplemental wing 2. Each of these options is discussed below.

1. Mechanical De-Pitching System to Maintain Main Rotor Authority

FIGS. 4, 7, 8 and 9 illustrate a mechanical de-pitching system. When the rotary wing aircraft 4 is moving through the air below the de-pitching airspeed, the mechanical de-pitching system is inactive and the supplemental wing 2 reaches a first self-balancing equilibrium angle of attack 58. The supplemental wing 2 provides lift 52 that increases with increasing airspeed.

Above the de-pitching airspeed, the pneumatic de-pitching system moves a trim control surface 66 (shown by FIG. 4) located at the trailing edge 48 of the airfoil 42 downward to increase the negative pitching moment 60 of the supplemental wing 2. The negative pitching moment 60 decreases the angle of attack 58. The supplemental wing 2 moves to a second self-balancing equilibrium angle of attack 58 with a decreased angle of attack 58. In the second equilibrium angle of attack 58, the supplemental wing 2 generates relatively less lift 52 than it would have generated if the supplemental wing 2 remained at the first equilibrium angle of attack 58. The decrease in lift 52 is compensated for by an increase in lift from the main rotor 6 of the rotary wing aircraft 4, preserving the control authority of the main rotor 6.

Figure 7:
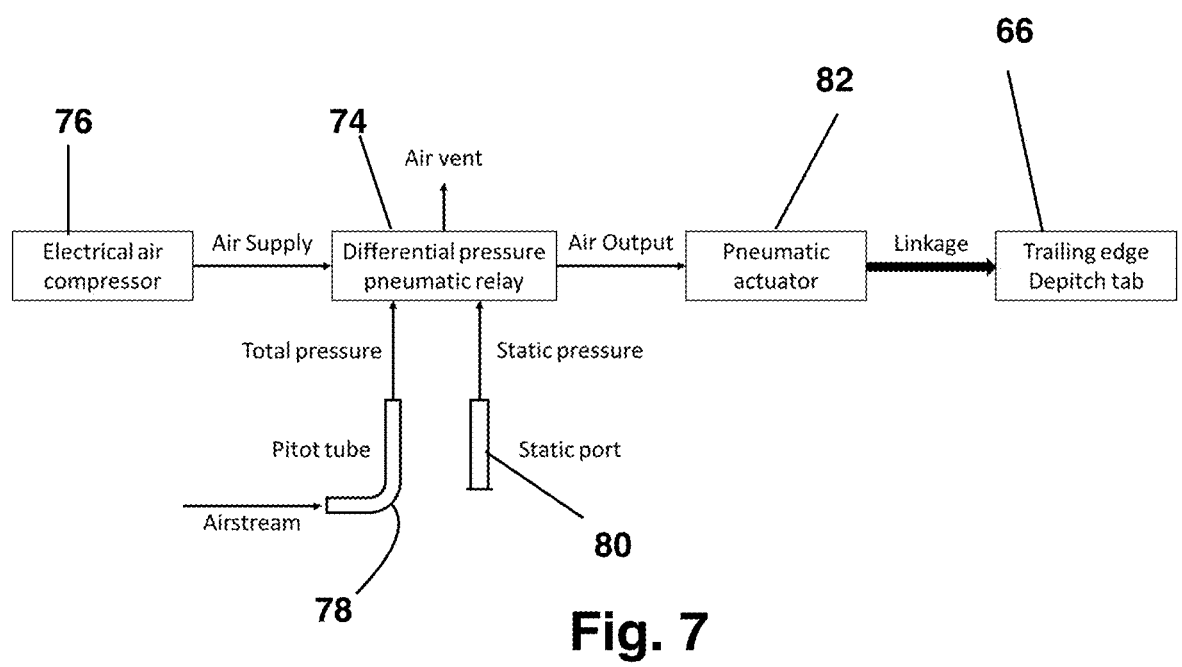
FIG. 7 is a schematic representation of a mechanical de-pitching system to maintain main rotor control authority.

FIG. 7 is a schematic diagram of a pneumatic de-pitching system. From FIG. 7, a pneumatic relay 74 controls the flow of compressed air from a pneumatic pressure source 76, such as a compressor, to the pneumatic actuator 82. The pneumatic actuator 82 is configured to move the trim control surface 6 when the pneumatic actuator 82 receives compressed air from the pneumatic relay 74. A pitot tube 78 and a static tube 80 inform the pneumatic relay 74 of the airspeed of the rotary wing aircraft 4. When the pneumatic relay 74 detects that the airspeed is above the de-pitching airspeed, the pneumatic relay 74 directs compressed air from the pneumatic pressure source 76 to the pneumatic actuator 82.

Figure 8:
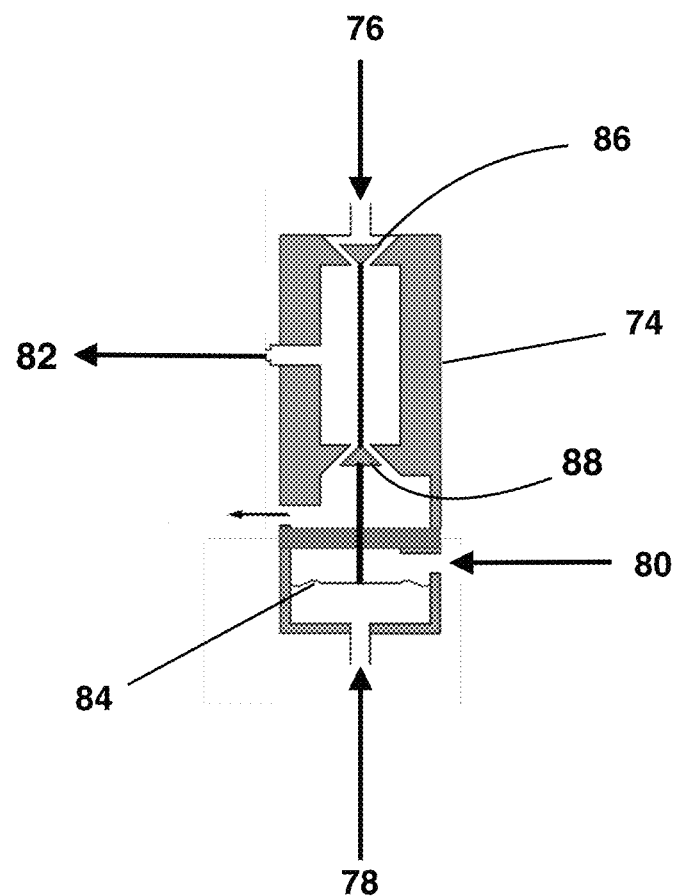
FIG. 8 is a schematic depiction of a differential pressure pneumatic relay.

FIG. 8 is a cross-section of the pneumatic relay 74. The pitot tube 78 and static tube 80 are connected to either side of a diaphragm 84. The diaphragm 84 is thereby sensible to the difference between total pressure as sensed by the pitot tube 78 and static pressure sensed by the static tube 80. The difference is the dynamic pressure. As aircraft 2 airspeed increases above the de-pitching airspeed, the diaphragm 84 senses the increase in dynamic pressure and opens the supply valve 86 and closes the vent valve 88. The pneumatic relay 74 admits compressed air from the pneumatic pressure source 76 and directs the compressed air to the pneumatic actuator 82, deflecting the trim control surface 66 downwards. The preload of a mechanical spring acting on the diaphragm 84 may select the de-pitching airspeed.

From FIG. 8, when airspeed reduces below the de-pitching airspeed, the diaphragm 84 moves and closes the supply valve 86 and opens the vent valve 88. Air pressure in the pneumatic actuator 82 decreases and the trim control surface 66 deflects upward, restoring the supplemental wing 2 to its original configuration. The supplemental wing 2 pitches up to the first equilibrium angle of attack 58 and provides relatively more lift 52. The restoring force returning the trim control surface 66 to its original position can be aerodynamic or mechanical, as by springs.

Figure 9:
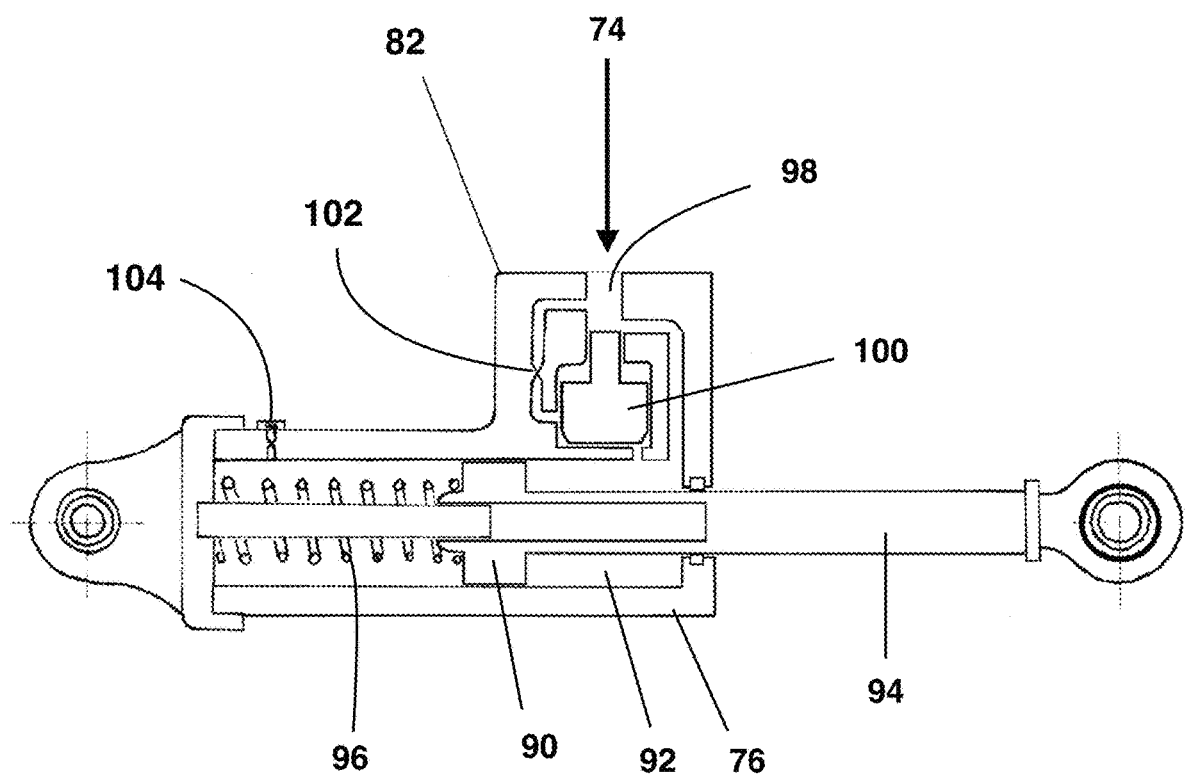
FIG. 9 is a cross section of a pneumatic de-pitching actuator.

FIG. 9 shows the pneumatic actuator 82, in this instance a pneumatic cylinder. The pneumatic actuator 82 may be the pneumatic cylinder, a pneumatic bladder, a diaphragm, or any other actuator using an air pressure differential to move an object. The pneumatic cylinder of FIG. 9 includes a piston 90 movable within a cylinder 92 and moving a rod 94 to move the trim control surface 66. A spring 94 returns the piston 88 and rod 92 to their original positions when the air pressure is released from the cylinder 90.

The pneumatic actuator 82 of FIG. 9 is configured to prevent a sudden movement of the trim control surface 66 in case of failure of the pneumatic de-pitching system, as by failure of the pneumatic pressure source 76. Sudden movement of the trim control surface 66 could cause a sudden increase in lift 52 from the supplemental wing 2 and loss of control authority of the main rotor 6 during flight above the de-pitching airspeed. The pneumatic actuator inlet port 98 is equipped with a one-way valve 100 providing unrestricted flow of compressed air from the pneumatic relay 74 to the pneumatic cylinder 92 and restricted discharge of air from the pneumatic cylinder 92 in the event of a sudden loss of air pressure. In the event of a sudden air pressure loss, air pressure within the cylinder 92 will close the one-way valve 100. Air discharging from the cylinder 92 will pass through a suitably-sized orifice 102, slowing the movement of the air and slowing the movement of the trim control surface 66. The slowed movement of the trim control surface 66 provides the pilot or control system with time to make suitable control arrangements, such as slowing the rotary wing aircraft 2 below the de-pitching speed. A secondary orifice 104 provides further control of the pneumatic actuator 82 dynamics.

Pneumatic actuation does not require electronics and provides an analog, continuous and simple control, unaffected by temperature and independent of other aircraft systems with minimal and benign failure modes. Integration of flow restrictors and small orifices in the pneumatic circuit can provide additional means of optimization of the system dynamics.

Figure 10:
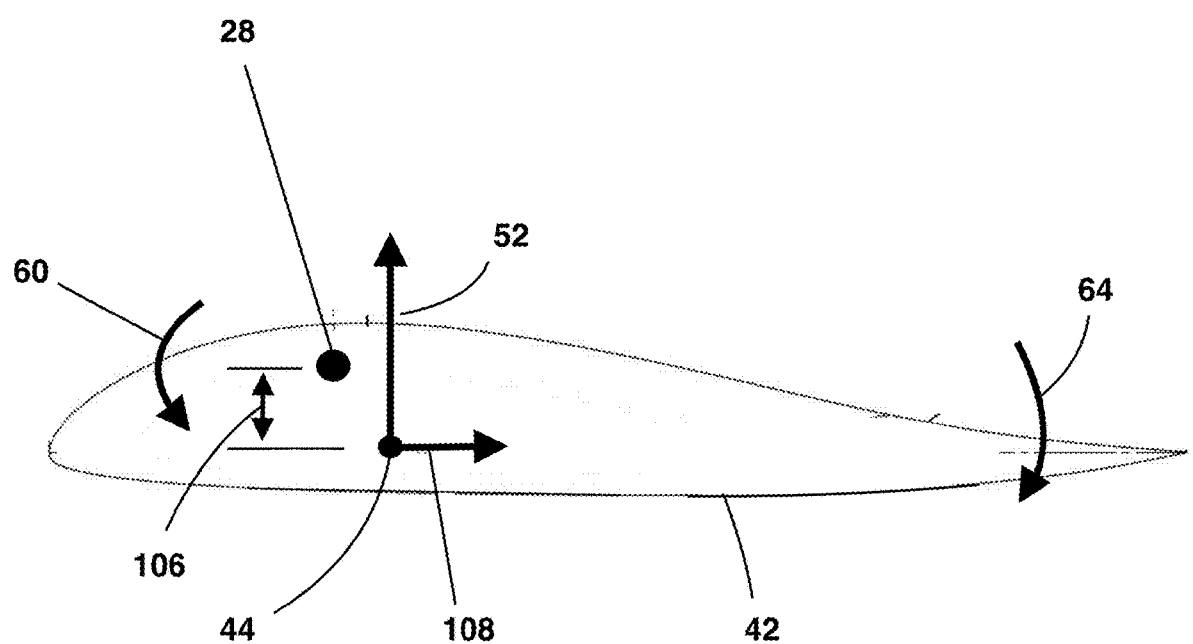
FIG. 10 is a cross section of a supplemental wing with the aerodynamic center below the pitch axis.

2. Mechanical De-Pitching to Maintain Rotor Authority by Location of the Pitch Axis As shown by FIG. 10, a configuration of the supplemental wing 2 to adjust the angle of attack 58 based on airspeed to maintain main rotor 6 control authority is to provide the supplemental wing 2 with a vertical offset 106 between the aerodynamic center 44 and the pitch axis 28. The location of the aerodynamic center 44 below the pitch axis 28 may be achieved by selecting the location of the wing spar 36 and bearings 38 with respect to the airfoil 42.

For the airfoil of FIG. 10, as the airspeed increases, so does the aerodynamic drag 108 on the supplemental wing 2. The drag 108, acting through the aerodynamic center 44, applies a negative pitching moment 60 that increases with increased airspeed. The negative pitching moment 60 causes the wing to reach an equilibrium with the negative pitching moment 60 and positive pitching moment 64 equal with an angle of attack 58 that reduces as the air speed increases, resulting in reduced lift 52 at higher airspeeds.

When the airspeed of the rotary wing aircraft 4 slows, the drag 108 acting through the aerodynamic center 44 reduces, reducing the negative pitching moment 60. The supplemental wing 2 reaches an equilibrium position with an angle of attack 58 that increases as the aircraft slows and that produce relatively greater lift 52.

Figure 11:
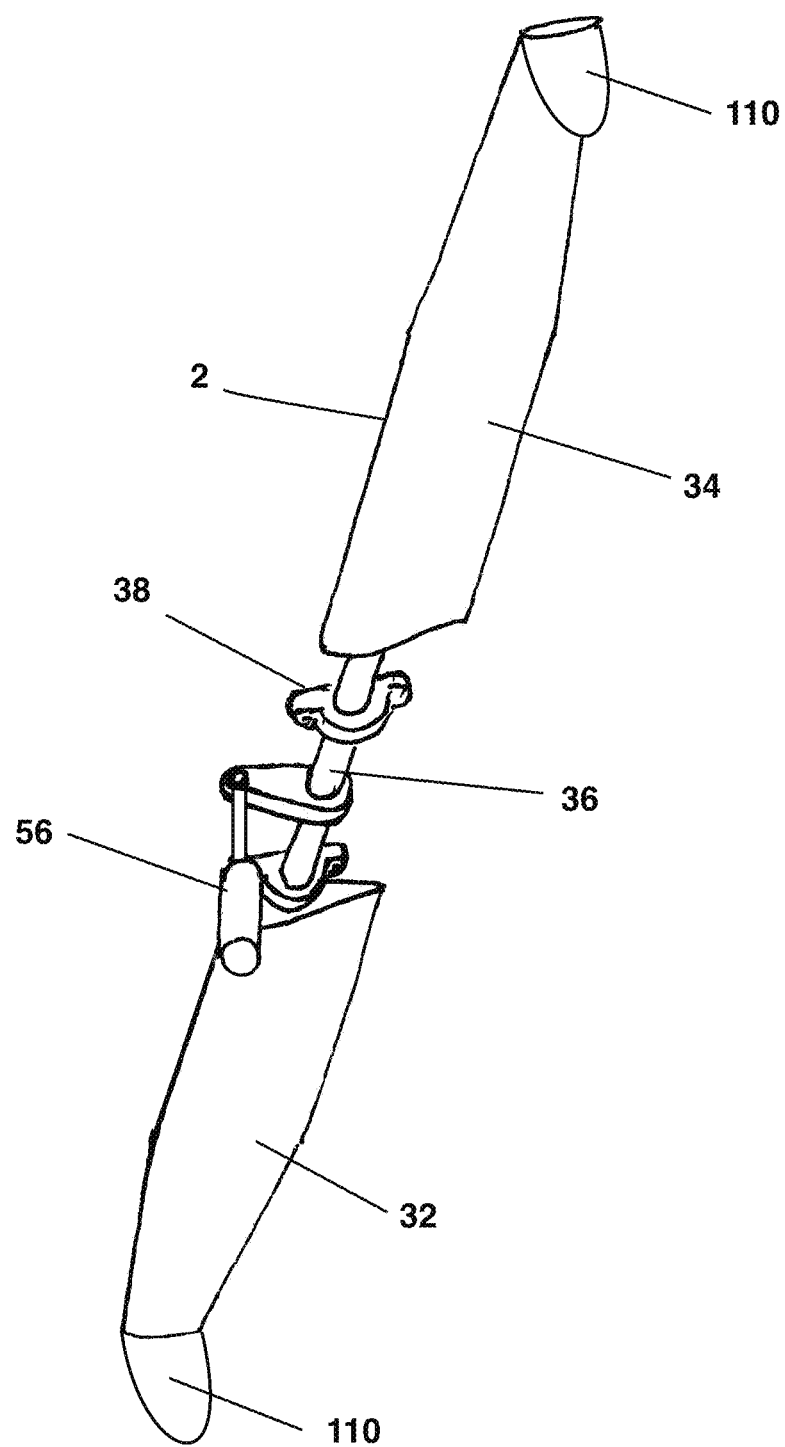
FIG. 11 is a perspective view of the supplemental wing with winglets.
Figure 12:
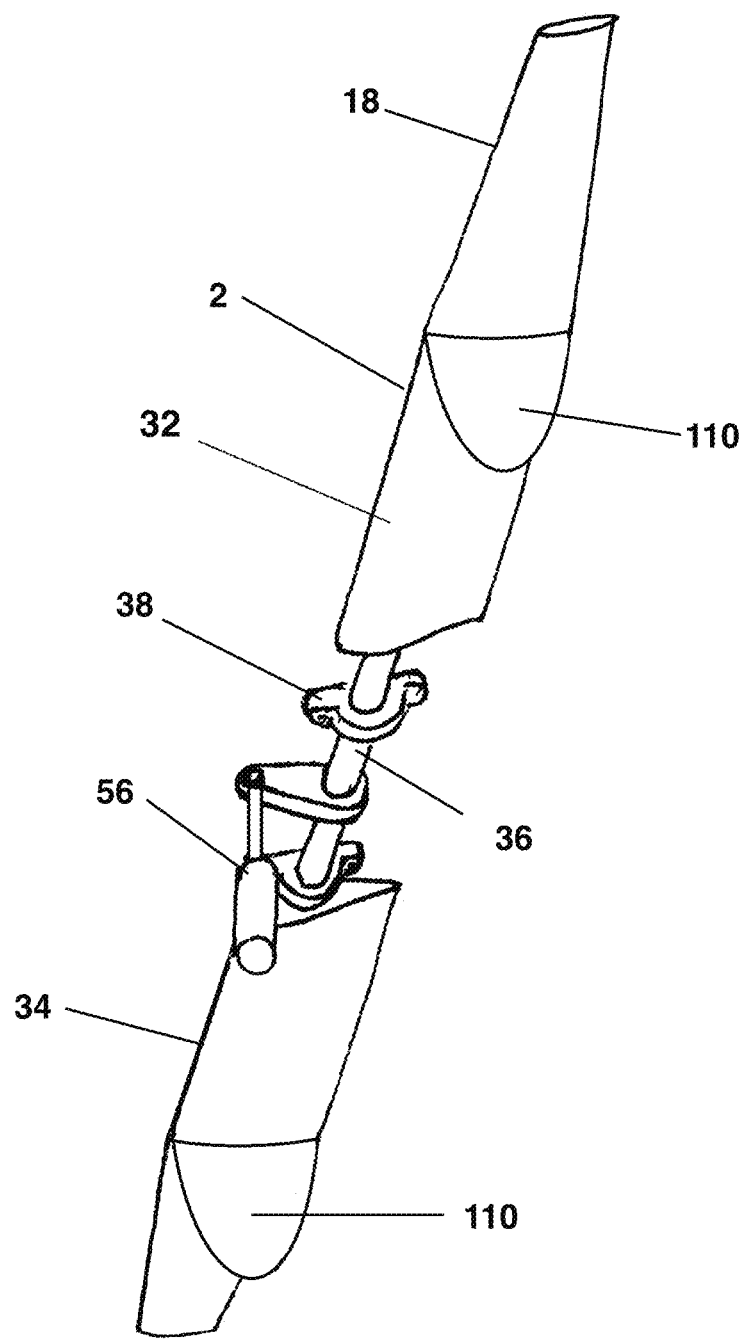
FIG. 12 is a perspective view of a second embodiment of the supplemental wing with winglets.

FIGS. 11 and 12 show additional configurations of the port and starboard wing portions 32, 34 to achieve a vertical offset 106 between the aerodynamic center 44 of the supplemental wing 2 and the pitch axis 28. Winglets 110 are disposed below the port and starboard wing portions 32, 34. The winglets 110 provide drag 108 in response to the relative wind 26 passing over the winglets 110. The drag 108 presented by the winglets 110 is below the port and starboard wing portions 32, 34, lowering the aerodynamic center 44 of the supplemental wing 2 with respect to the pitch axis 28, resulting in an angle of attack 58 that decreases with increasing airspeed.

3. Electronic De-Pitching to Maintain Rotor Authority

Figure 13:
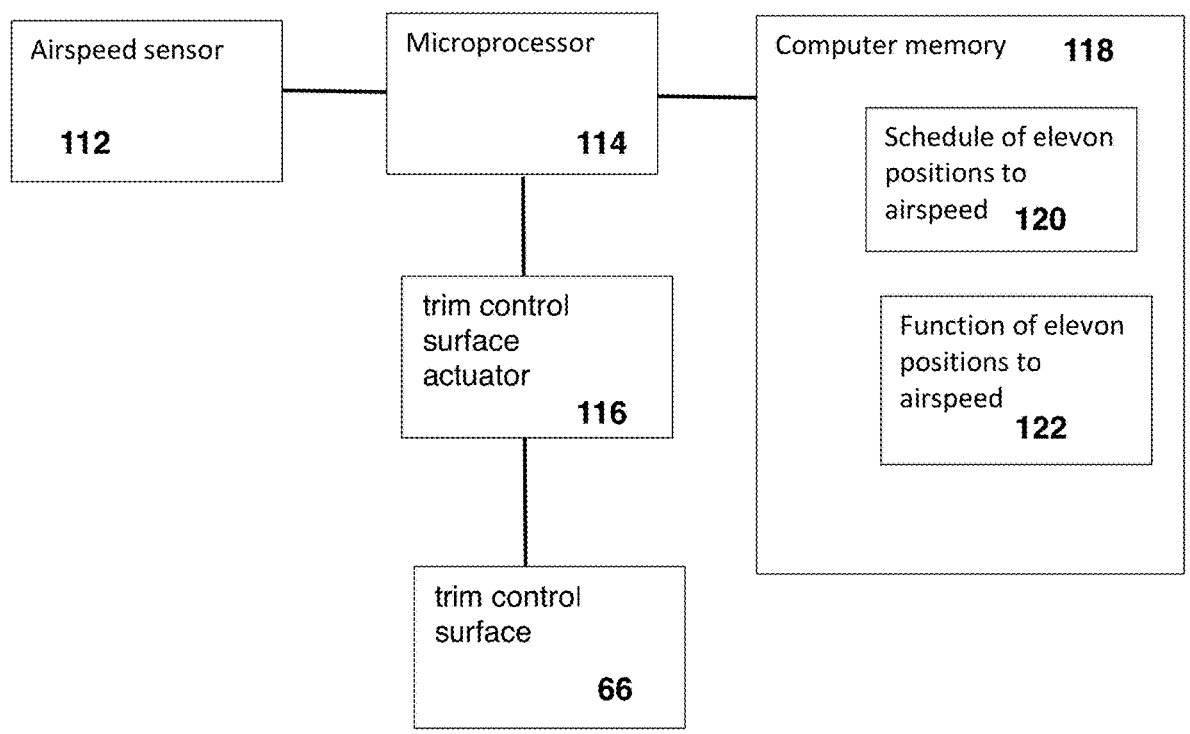
FIG. 13 is a schematic diagram of an electronic de-pitching system to maintain main rotor control authority.

From FIG. 13, an electronic system, rather than a mechanical system, may de-pitch the supplemental wing 2 when the airspeed exceeds the de-pitching airspeed. An airspeed sensor 112, which may be a pitot tube 78 and a static tube 80, is operably attached to a microprocessor 114. The microprocessor 114 controls an electrical trim control surface actuator 116 that operates the trim control surface 66. The trim control surface actuator 116 may be any electrical appliance known in the art and suitable for moving the trim control surface 66, such as a stepper motor or a motor combined with a trim control surface position sensor that detects the position of the trim control surface 66.

The microprocessor 114 is programmed to access computer memory 118 based on the information received from the airspeed sensor 112. The microprocessor 114 is programmed to either consult a schedule of trim control surface positions 120 to select a trim control surface 66 position based on the detected airspeed or is programmed to apply a function 122, such as a proportional function, to determine trim control surface 66 position based on the detected airspeed. In either case, the microprocessor 114 commands the trim control surface actuator 116 to move the trim control surface 66 to the selected position.

As the airspeed of the rotary wing aircraft changes, the commanded trim control surface 66 position also may change, all to provide lift 52 to the rotary wing aircraft 4 while avoiding loss of control authority of the main rotor 6, as described above. The de-pitching airspeed may be selected to be substantially less than the cruise speed of the rotary wing aircraft (e.g. 70% of cruise speed). The supplemental wing 2 may be larger than a supplemental wing 2 designed for the desired lift 52 at the cruise speed. By setting the de-pitching system, either mechanical or electronic, to act at the lower speed, the supplemental wing load and main rotor load above the de-pitching speed remain constant. As a consequence, sufficient control authority will be available from the main rotor 6 for all flight regimes. Further, since the lift 52 provided by the supplemental wing 2 remains constant after reaching the de-pitching speed, the drag 108 penalty will remain low at higher airspeeds, thus providing better aircraft 4 efficiency at high speeds thanks to the larger supplemental wing 2.

The above describes as alternatives three de-pitching approaches to maintain main rotor 6 control authority at high forward speed; however, any of the three approaches may be combined with any other of the approaches. For example, an electronic de-pitching system may be combined with locating the aerodynamic center 44 below the pitch axis 28.

D. Preventing Aft Translation

When the rotary wing aircraft 4 is in the hover position 10 (shown by FIG. 2), the supplemental wing 2 will experience the downwash of the main rotor 6 as relative wind 26. The relative wind 26 moving across the supplemental wing will generate lift 52, applying a translational force to the rotary wing aircraft 4 in the aft direction 14. To prevent the unwanted translational force, the rotary wing aircraft 4 may either move the trim control surface 66 to change the angle of attack 58 or may deploy air dams or spoilers, all to eliminate the lift 52. The systems for preventing aft translation may be mechanical or electronic, as discussed below.

1. Mechanical Aft Translation Prevention

Figure 14:
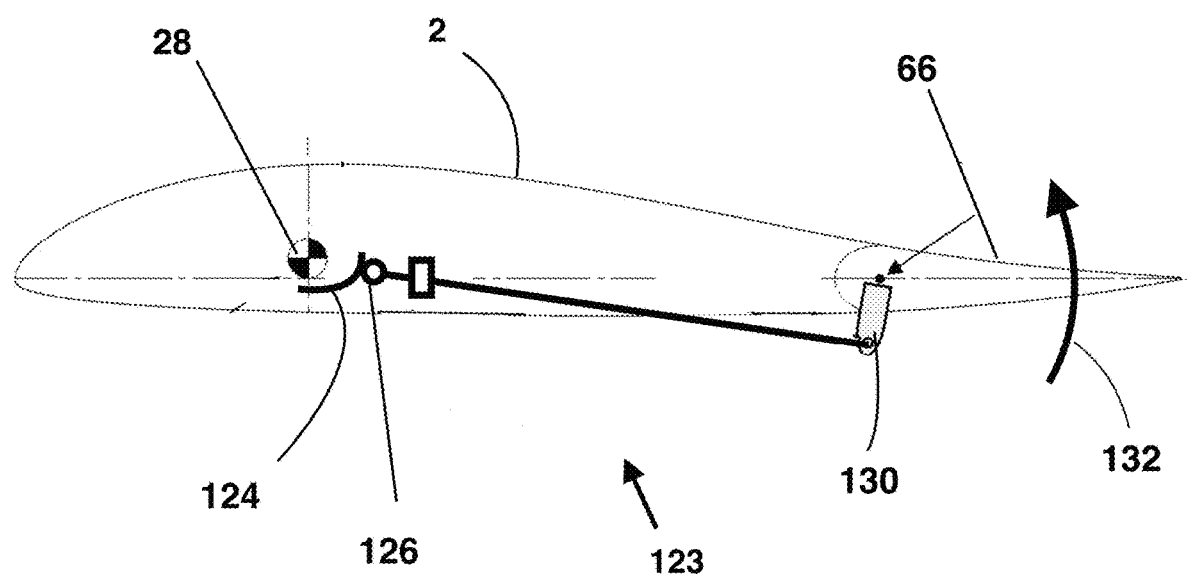
FIG. 14 is a cross section of the supplemental wing and a mechanical de-pitching system to avoid aft translation in the forward flight position.
Figure 15:
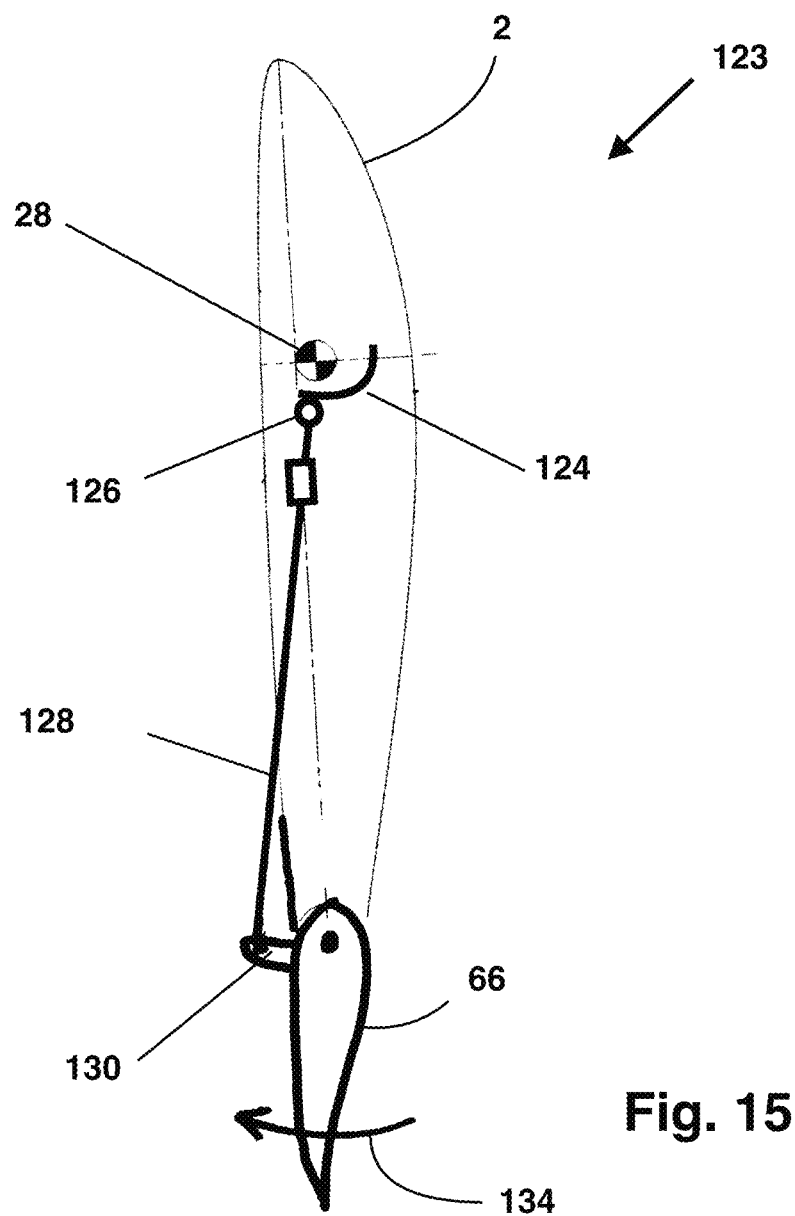
FIG. 15 is a cross section of the supplemental wing and a de-pitching system to avoid aft translation in the hover position.

FIGS. 14 and 15 illustrate a mechanical system 123 to prevent aft translation during hover. FIG. 14 is a schematic section view of the supplemental wing 2 in the forward flight position 8 showing the mechanical aft translation system 123. FIG. 15 shows the supplemental wing 2 and mechanical system 123 in the hover position 10.

From FIG. 14, a stationary cam 124 is attached to the fuselage 18 and does not rotate with the supplemental wing 2. A cam follower 126 rides on the cam 124 and moves a tie rod 128. The tie rod 128 moves crank arm 130, which is attached to the trim control surface 66. When the supplemental wing 2 moves to the forward flight position 8, the crank arm 130 causes the trim control surface 66 to move in the direction indicated by arrow 132, allowing the supplemental wing 2 to provide lift 52 as described above.

From FIG. 15, when the supplemental wing 2 moves to the hover position 10, the stationary cam 124 does not move while the supplement wing 2 rotates about the pitch axis 28. The cam follower 126 rides the cam 124 so that the cam follower 126 is closer to the pitch axis 28 than when the supplemental wing 2 is in the forward flight position 8. The tie rod 128 pulls the crank arm 130 toward the pitch axis 28, moving the trim control surface 66 in the direction indicated by arrow 134. The trim control surface 66 reduces the angle of attack 58 of the supplemental wing 2, eliminating the lift and the aft translation force.

The trim control surface 66 may be the same trim control surface 66 that de-pitches the supplemental wing 2 to maintain main rotor 6 control authority as described above or may be a different control surface. The trim control surface 66 may be an elevon, a flap, an aileron, a flaperon or a trim tab. The mechanical system 123 may utilize any other mechanism to detect relative rotational motion of the supplemental wing 2 and fuselage 18, such as a gear, cable or linkage.

2. Electronic Aft Translation Prevention

Figure 16:
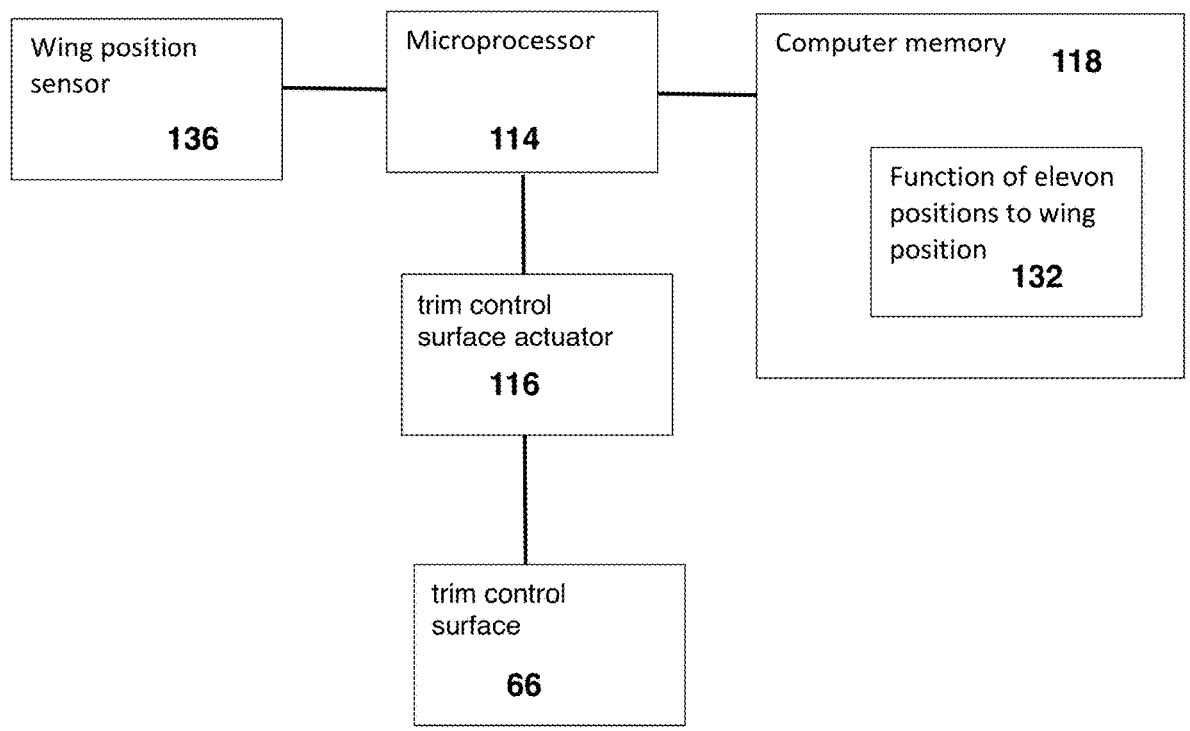
FIG. 16 is a schematic diagram of an electronic system to avoid aft translation.

FIG. 16 shows that the aft translation prevention system may be electronic. A wing position sensor 136 informs the microprocessor 114 as to whether the supplemental wing 2 is in the hover position 10, the forward flight position 8, or a position intermediate to the hover and forward flight positions 10, 8. The wing position sensor 136 also may inform the microprocessor 114 of the acceleration and rotational velocity of the supplemental wing 2 about the pitch axis 28. The microprocessor 114 consults computer memory 118, which includes a function 132 or a schedule instructing the microprocessor of an appropriate trim control surface 66 position, which may be based on the rotational position, velocity and acceleration of the supplemental wing 2. When the microprocessor 114 detects that the supplemental wing is in the hover position 10, the microprocessor 114 instructs the trim control surface actuator 116 to move the trim control surface 66 in the direction indicated by arrow 134 on FIG. 15 to a selected trim control surface 66 position. The selected trim control surface 66 position will provide a negative pitching moment 60 to the supplemental wing 2, pitching the supplemental wing down with respect to the relative wind 26 from the downwash of the rotor 6 and eliminating the lift 52 pushing the supplemental wing 2 in the aft direction 14.

When the microprocessor 114 detects that the supplemental wing 2 is in the forward flight position 8, the microprocessor 114 will cause the trim control surface actuator 116 to move the trim control surface 66 in the direction shown by arrow 132 on FIG. 14, increasing the positive pitching moment 64 and increasing the lift 52 generated by the supplemental wing 2.

E. Modular Rotary Wing Aircraft

Figure 17:
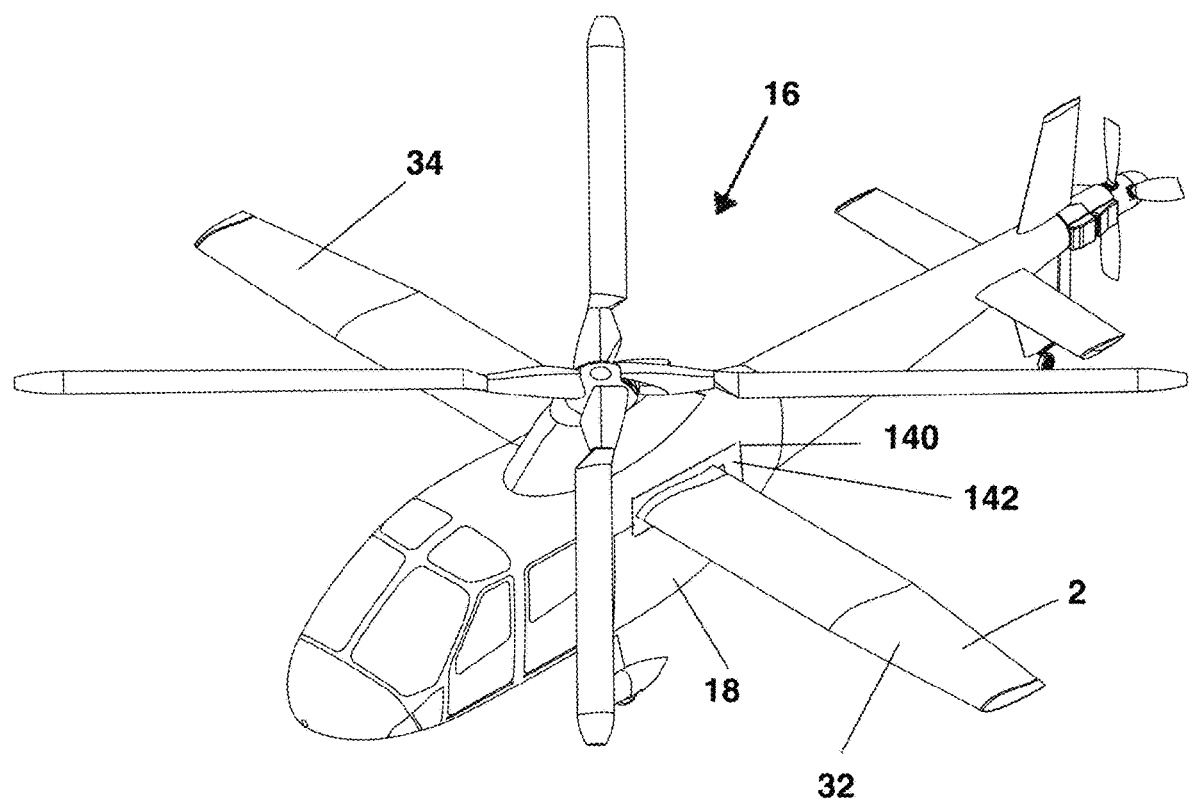
FIG. 17 is a perspective view of a modular supplemental wing installed in a modular rotary wing aircraft.
Figure 18:
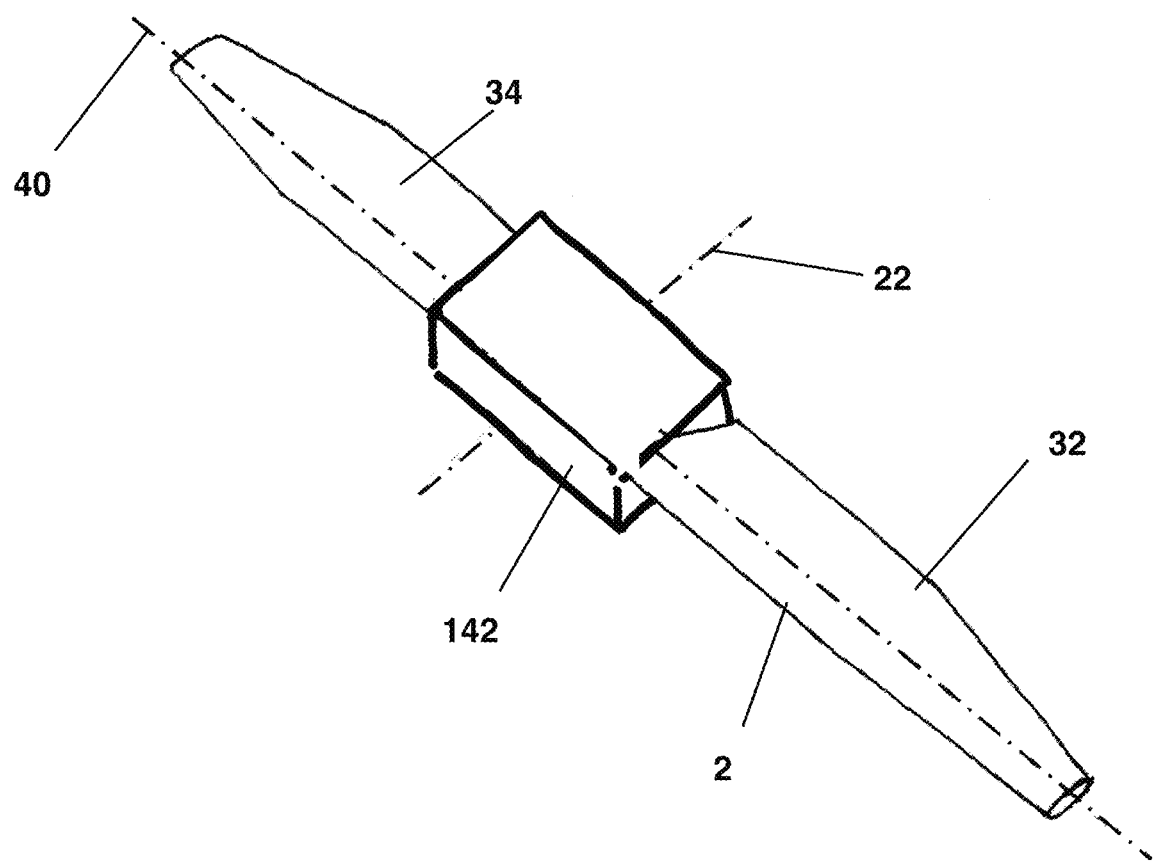
FIG. 18 is a perspective view of a modular supplemental wing separated from the modular rotary wing aircraft.

From FIGS. 17 and 18, the supplemental wing 2 may be a modular component of a modular rotary wing aircraft 16. FIG. 17 shows the modular rotary wing aircraft 16 with the supplemental wing 2 installed. FIG. 18 shows the supplemental wing 2 separated from the modular rotary wing aircraft 16. The modular supplemental wing 2 may be received and supported by a corresponding opening 140 in the fuselage 18 of the modular rotary wing aircraft 16.

The modular supplemental wing 2 includes a central unit 142. The wing spar 36 passes through the central unit 142 and the bearings 38 are located within the central unit 142, as is the damper 56. All of the components and systems of the supplemental wing 2 described elsewhere in this document are either contained within the central unit 142 or are removable along with the central unit 142. Those systems include the mechanical or electronic de-pitching system to maintain main rotor 6 authority, the mechanical de-pitching system to maintain main rotor 6 authority by location of the pitch axis 128, the mechanical or electronic system 123 to prevent translation in the aft direction 14 when the supplemental wing 2 is in the hover position 10, the power assist system, the port and starboard wing portions 32, 34 and wing spar 36 and bearings 38, all as described herein.

The central unit 142 may connect to the electrical system of the modular rotary wing aircraft 16 when the central unit 142 is installed to power any electrical systems, including the electronic de-pitching system to maintain main rotor 6 authority, the electronic system to prevent translation in the aft direction 14 when the supplemental wing 2 is in the hover position 10, or the pneumatic pressure source 76 for the mechanical de-pitching system to maintain main rotor 6 control authority. In all respects, the modular supplemental wing 2 installed on a modular rotary wing aircraft 16 operates as described elsewhere in this document for the supplemental wing 2 on a rotary wing aircraft 4.

F. Retrofit to a Conventional Rotary Wing Aircraft

Figure 19:
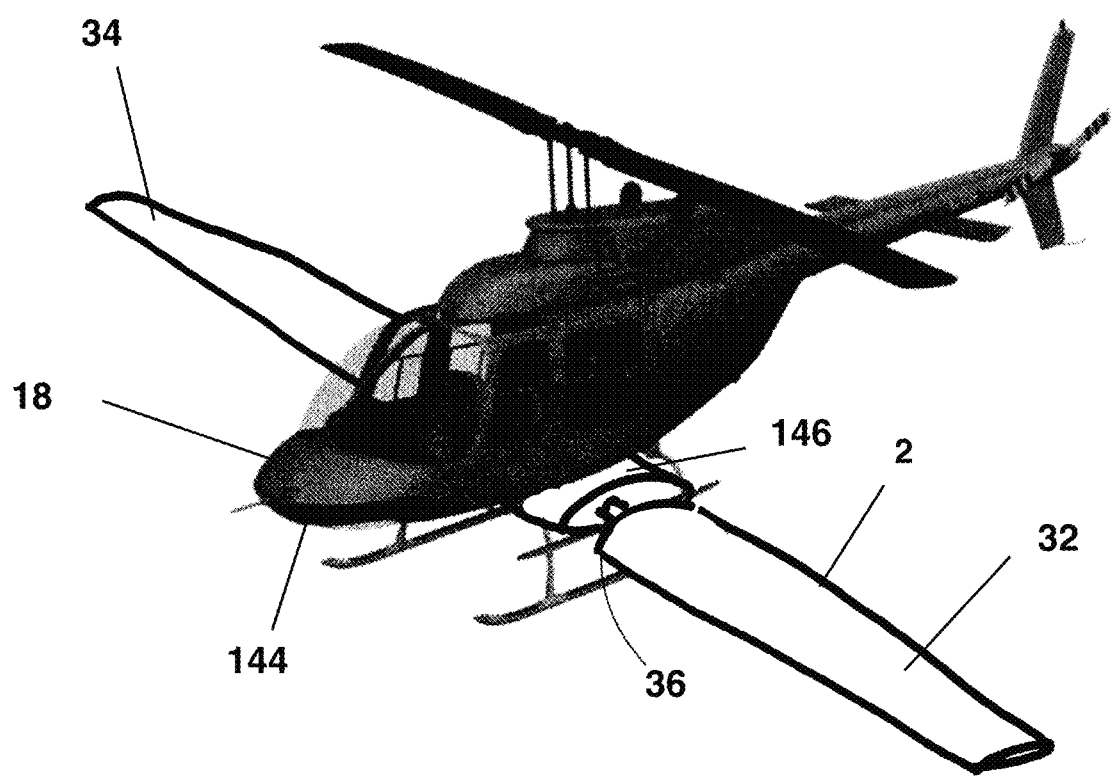
FIG. 19 is a perspective view of a retrofit supplemental wing retrofitted to an existing helicopter.
Figure 20:
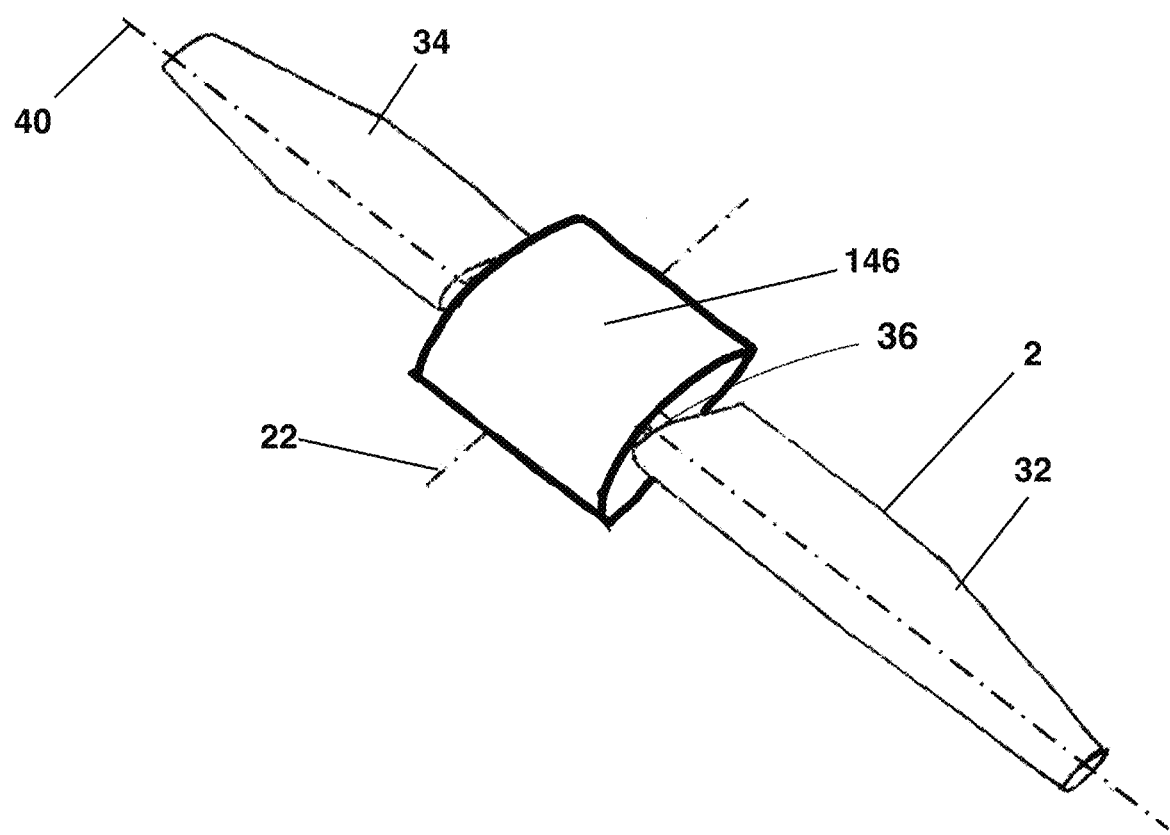
FIG. 20 is a perspective view of the retrofit supplemental wing separated from the existing helicopter.

As shown by FIGS. 19 and 20, the supplemental wing 2 may be retrofitted to an existing conventional rotary wing aircraft 144 that was not originally designed to accommodate the supplemental wing 2. FIG. 19 illustrates a conventional rotary wing aircraft 144 with the supplemental wing 2 installed. FIG. 20 shows the retrofit supplemental wing 2 separated from the conventional rotary wing aircraft 144.

The retrofit supplemental wing 2 includes a retrofit central unit 146. As for the modular central unit 134 described above, the wing spar 36 passes through the retrofit central unit 146 and the bearings 38 are located within the retrofit central unit 146, as is the damper 56. All of the components and systems described elsewhere in this document relating to the supplemental wing 2 are either contained within the retrofit central unit 146 or are removable along with the retrofit central unit 146. Those systems include the mechanical or electronic de-pitching system to maintain main rotor 6 authority, the mechanical de-pitching system to maintain main rotor 6 authority by location of the pitch axis 28, the mechanical or electronic system to prevent aft translation when the supplemental wing 2 is in the hover position 10, the port and starboard wing portions 32, 34, wing spar 36 and bearings 38, and power assist system all as described elsewhere. The retrofit central unit 146 may connect to the rotary wing aircraft 4 electrical system to provide power to the supplemental wing 2, as described above for the modular central unit 142.

The retrofit central unit 146 is configured to be attached to the fuselage 18 of the conventional rotary wing aircraft 144, as by pins, clips, cables or threaded fasteners. The retrofit central unit 146 may attach to existing hardpoints on the fuselage. Alternatively, hard points may be added to the fuselage 18 to engage the retrofit central unit 146.

The retrofit central unit 146 is attached to the conventional rotary wing aircraft 144 having a single main rotor 6 so that the aerodynamic center 44 of the retrofit supplemental wing 2 is aligned with the center of lift of the main rotor 6, in which event the supplemental wing 2 will have little or no effect on the control laws of the conventional rotary wing aircraft 144. Where the conventional rotary wing aircrafts 144 has two or more rotors 6, the aerodynamic center 44 of the supplemental wing 2 may be aligned with the combined center of lift of the rotors 6 and the supplemental wing 2 will have little or no effect on the control laws of the rotary wing aircraft 144.

G. Power Assist

Figure 21:
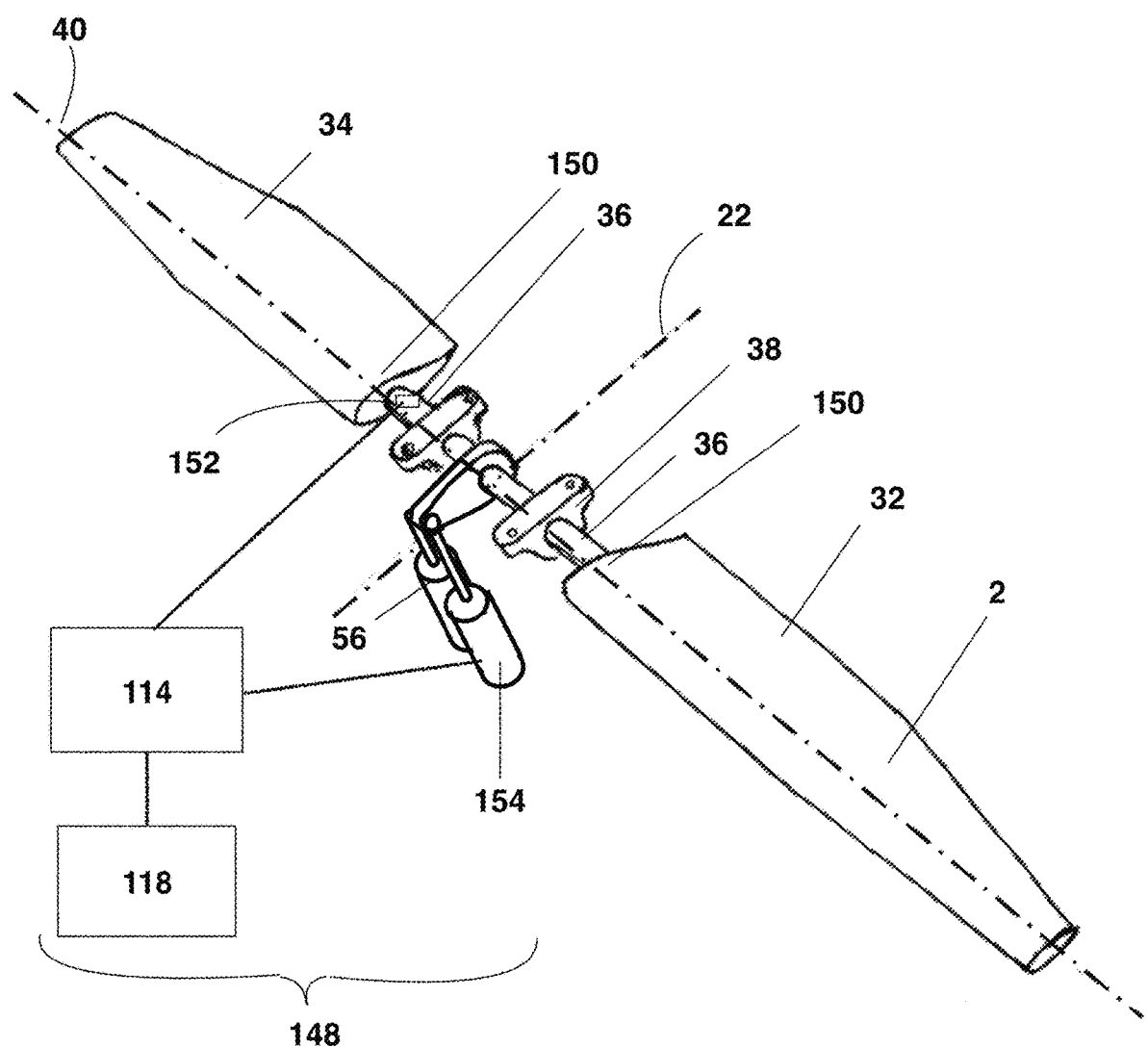
FIG. 21 is a schematic view of a power assist system.

From FIG. 21, friction between the wing spar 36 and bearings 38 and friction within the other mechanical systems of the supplemental wing 2 may prevent the supplemental wing 2 from passively rotating about the pitch axis 28 due to aerodynamic forces alone to an equilibrium position where the negative pitching moment 60 and positive pitching moment 64 balance. To overcome the friction and to rotate the supplemental wing 2 to the equilibrium position, the supplemental wing 2 may include a power assist system 148. The power assist system detects the sum of the positive and negative pitching moments 64, 60 acting on the supplemental wing 2 and provides additional torque to the supplemental wing 2 in the same direction as the sum of the positive and negative pitching moments 64, to overcome the friction. Because the power assist system 148 is assisting aerodynamic forces to rotate the supplemental wing 2, the power assist system 148 need only apply enough torque to the supplemental wing 2 to overcome friction. The force applied by the power assist system 148 is less than that of a wing rotation system that is not supplementing aerodynamic forces.

The power assist system 148 detects the direction of the sum of the positive and negative pitching moments 64, 60. The sum of the pitching moments 64, 60 deforms the wing spar 36 at the wing root 150 in torsion. One or more strain gauges 152 are disposed on the wing spar 36 at the wing root 150 and on the wing 2 side of the bearing 38 to detect the torsional deformation of the wing spar 36 and hence the sum of the positive and negative pitching moments 64, 60. The one or more strain gauges 152 may be disposed on either or both of the port and starboard wings 32, 34 on the wing spar 36.

The one or more strain gauges 152 are operably attached to a microprocessor 114 that is programmed through computer memory 118 to determine the direction and magnitude of the torsional deformation of the wing spar 36, and hence the direction and magnitude of the sum of the positive and negative pitching moments 64, 60 acting on the supplemental wing 2. If the microprocessor 114 determines that the magnitude of the torsional deformation and hence the sum of the positive and negative pitching moments 64, exceeds a predetermined minimum, the microprocessor 114 directs a power assist actuator 154, such as an electrical, pneumatic or hydraulic actuator, to rotate the wing 2 in the same direction as the torque applied by sum of the positive and negative pitching moments 64, 60. The microprocessor 114 will continue to cause the power assist actuator 154 to rotate the wing 2 until the sum of the positive and negative pitching moments 64, 60 as detected by the strain gauges 152 falls below the predetermined minimum.

Any feature shown on any of the figures for one embodiment may apply to any other figure and any other embodiment. Unless the context requires otherwise, any element identified by an element number on any figure is the same or equivalent to an element identified by that element number on another figure.

The following is a list of numbered elements from the specification and drawings:

Supplemental wing 2
Rotary-wing aircraft 4
Main rotor 6
Forward flight position 8
Hover position 10
Pitch of the supplemental wing 12
Aft direction 14
Modular rotary wing aircraft 16
Fuselage 18
Tail rotor 20
Aircraft longitudinal axis 22
Forward direction 24
relative wind 26
Pitch axis 28
Main rotor axis of rotation 30
Port wing portion 32
Starboard wing portion 34
Wing spar 36
Bearings 38
Span axis 40
Airfoil 42
Aerodynamic center 44
Leading edge 46
Trailing edge 48
Chord 50
Lift 52
Center of gravity 54
Damper 56
Angle of attack 58
Negative pitching moment 60
Reflex camber airfoil 62
Positive pitching moment 64
Trim control surface 66
Meter orifice 68
Control rod 70
End stops 72
Pneumatic relay 74
Pneumatic pressure source 76
Pitot tube 78
Static tube 80
Pneumatic actuator 82
Diaphragm 84
Supply valve 86
Vent valve 88
Piston 90
Cylinder 92
Rod 94
Spring 96
Inlet port 98
One-way valve 100
Orifice 102
Secondary orifice 104
Vertical offset 106
Drag 108
Winglets 110
Airspeed sensor 112
Microprocessor 114
Trim control surface actuator 116
Computer memory 118
Schedule of trim control surface positions to airspeed 120
Function of trim control surface116 positions to airspeed 122
Mechanical aft translation system 123
Stationary cam 124
Cam follower 126
Tie rod 128
Crank arm 130
Arrow 132 (FIG. 14)
Arrow 134 (FIG. 15)
Position sensor 136
function of trim control surface position to wing position 138
Opening 140
Central unit 142
Conventional rotary wing aircraft 144
Retrofit central unit 146
Power assist system 148
Wing root 150

Strain gauge 152
Power assist actuator 154

What is claimed is:

1. A rotary-wing aircraft, the rotary-wing aircraft comprising:
   a. a fuselage, the fuselage having an aircraft longitudinal axis defining a forward direction;
   b. a rotor attached to the fuselage, the rotor having a rotor axis of rotation generally normal to the longitudinal axis, the rotor being configured to rotate about the rotor axis of rotation to provide lift to the rotary-wing aircraft;
   c. a supplemental wing attached to the fuselage, the supplemental wing being rotatable about a pitch axis with respect to the fuselage, the supplemental wing defining a span, the pitch axis being substantially parallel to the span, the pitch axis being substantially normal to the longitudinal axis and substantially normal to the rotor axis of rotation, the supplemental wing defining a chord substantially normal to the span, the supplemental wing being rotatable about the pitch axis between a forward flight position and a hover position, the chord being substantially parallel to the longitudinal axis when the supplemental wing is in the forward flight position, the chord being substantially normal to the longitudinal axis when the supplemental wing is in the hover position, the supplemental wing being rotatable through a plurality of positions intermediate to the hover and forward flight positions;
   d. the supplemental wing defining a leading edge and a trailing edge, the supplemental wing defining a aerodynamic center and an angle of attack when a relative wind is moving over the supplemental wing from the leading edge to the trailing edge, the aerodynamic center being aft of the pitch axis when the aircraft is flying in the forward direction in the forward flight position so that a lift acting through the aerodynamic center applies a negative pitching moment to the supplemental wing when the aircraft is flying in the forward direction with the supplemental wing in the forward flight position;
   e. wherein the supplemental wing has an aerodynamic configuration to apply an positive pitching moment to the supplemental wing when the aircraft is flying in the forward direction with the supplemental wing in the forward flight position so that the supplemental wing rotates about the pitch axis to an equilibrium position in which the positive pitching moment balances the negative pitching moment;
   f. wherein the rotor has a control authority over the rotary wing aircraft in flight, the aircraft further comprising: a trim control system, the trim control system including an airspeed sensor to detect a speed of the relative wind over the supplemental wing from the leading edge to the trailing edge when the aircraft is flying in the forward direction and the supplemental wing is in the forward flight position, the trim control system including a movable trim control surface at the trailing edge of the supplemental wing, the trim control system having a configuration to depress the trim control surface when the aircraft is flying in the forward direction at greater than a predetermined speed so that the trim control surface increases the negative pitching moment of the supplemental wing and reduces the amount of lift generated by the supplemental wing, whereby the control authority of the rotor is preserved.

2. The aircraft of claim 1 wherein the aerodynamic configuration of the supplemental wing to apply the positive pitching moment that balances the negative pitching moment is that the supplemental wing defines an airfoil, the airfoil being a reflex camber airfoil.

3. The aircraft of claim 1 wherein the aerodynamic configuration of the supplemental wing to apply the positive pitching moment so that the positive pitching moment balances the negative pitching moment is the trim control system.

4. The aircraft of claim 1 wherein the supplemental wing is attached to the fuselage by a bearing, the bearing defining the pitch axis, the supplemental wing being passively rotatable about the pitch axis with respect to the bearing between the forward flight and the hover positions and through the plurality of positions intermediate to the forward flight and hover positions.

5. The aircraft of claim 4, the aircraft further comprising: a damper, the damper being configured to dampen the passive rotation of the supplemental wing with respect to the bearing.

6. The aircraft of claim 1 wherein the supplemental wing defines a port wing portion and a starboard wing portion, each of the port and starboard wing portions defining a wing root, the wing roots of the port and starboard wing portions being joined by a wing spar, the wing spar is attached to the fuselage by a bearing, the bearing defining the pitch axis, the wing spar and supplemental wing being rotatable about the pitch axis with respect to the bearing between the forward flight and the hover positions and through the plurality of positions intermediate to the forward flight and hover positions, a friction of the spar with respect to the bearing resisting the rotation of the supplemental wing, the aircraft further comprising:
   a. a strain gauge, the strain gauge having a configuration to detect a sum of the positive pitching moment and negative pitching moment of the port or the starboard wing;
   b. a power assist actuator, the power assist actuator being operably attached to the strain gauge, the power assist actuator being configured to apply an actuator moment to the supplemental wing adequate to overcome the friction of the wing spar with respect to the bearing and to rotate the supplemental wing consonant with the sum of the positive pitching moment and the negative pitching moment.

7. The aircraft of claim 6 wherein the configuration of the the strain gauge to detect the sum of the positive and negative pitching moment of the port or starboard wing is that the strain gauge is attached to the wing spar between the wing root of the port or starboard wing and the bearing, the strain gauge configured to detect a strain of the wing spar in response to the sum of the positive and negative pitching moments.

8. The aircraft of claim 7 wherein the actuator is an electrical, hydraulic or pneumatic actuator.

9. The aircraft of claim 1 wherein the airspeed sensor comprises: a pitot tube and a static tube exposed to the relative wind.

10. The aircraft of claim 9 wherein the configuration of the trim control system to depress the trim surface comprising: the pitot tube and the static tube are operably connected to a pneumatic relay, the pneumatic relay selectably feeding an air from an air compressor to a pneumatic cylinder when the pneumatic relay detects that the pitot and static tubes have detected the speed of the relative wind in excess of the predetermined speed, the pneumatic cylinder being operably connected to the trim control surface to depress the trim control surface.

11. The aircraft of claim 9 wherein the configuration of the trim control system to depress the trim surface comprises: the pitot tube and the static tube are operably connected to a microprocessor, the microprocessor is programmed to select a trim surface position based on the detected speed of the relative wind over the supplemental wing, the microprocessor being operably connected to an electrical, pneumatic or hydraulic trim actuator, the electrical, pneumatic or hydraulic actuator being operably connected to the trim surface and to move the trim surface to the selected trim surface position.

12. The aircraft of claim 1 wherein the rotor has collective and cyclic pitch, the collective and cyclic pitch of the rotor providing the control authority over the rotary wing aircraft in flight, and wherein the pitch axis of the supplemental wing is selected to be above the aerodynamic center when the rotary-wing aircraft is flying in the forward direction with the supplemental wing in the forward flight position so that a drag acting through the aerodynamic center applies a negative pitching moment to the supplemental wing that increases with increasing airspeed, whereby lift from the supplemental wing is reduced and authority of the rotor is preserved.

13. The aircraft of claim 1 wherein
 a. the movable trim control surface having a configuration for movement to a translation-preventing position when the supplemental wing moves to the hover position;
 b. when the movable trim control surface is in the translation-preventing position, the movable trim control surface is depressed so that when the relative wind passes over the supplemental wing from the leading edge to the trailing edge and the supplemental wing is in the equilibrium position, the supplemental wing does not experience a significant lift acting through the aerodynamic center, whereby the aircraft does not experience a translational force in the aft direction from the supplemental wing when the aircraft is hovering.

14. The aircraft of claim 13 wherein the configuration for movement of the movable trim control surface to the translation-preventing position is a mechanical linkage connecting the fuselage to the movable trim control surface, the mechanical linkage comprising: a gear, cam or link configured to detect when the supplemental wing is in the hover position, the gear, cam or link being operably connected to the movable trim control surface.

15. The aircraft of claim 13 wherein the configuration for movement of the movable trim control surface to the translation-preventing position comprises an electrical, hydraulic or pneumatic position detector detecting when the supplemental wing is in the hover position, the position detector being operably connected to an electrical, hydraulic or pneumatic actuator, the electrical, pneumatic or hydraulic actuator being operably connected to the movable trim control surface.

16. A retrofit supplemental wing for a rotary-wing aircraft, the rotary-wing aircraft defining an aircraft longitudinal axis and a forward direction, the rotary wing aircraft having a rotor with a rotor axis of rotation to provide a lift to the aircraft, the retrofit supplemental wing comprising:
 a. A retrofit central unit, the retrofit central unit being selectably attachable to the rotary wing aircraft;
 b. a supplemental wing attached to the retrofit central unit, the supplemental wing being rotatable about a pitch axis with respect to the retrofit central unit, the supplemental wing defining a span, the pitch axis being substantially parallel to the span, the pitch axis being substantially normal to the longitudinal axis and substantially normal to the rotor axis of rotation when the module body is attached to the aircraft, the supplemental wing defining a chord substantially normal to the span, the supplemental wing being rotatable about the pitch axis between a forward flight position and a hover position, the chord being substantially parallel to the longitudinal axis when the retrofit central unit is attached to the aircraft and the supplemental wing is in the forward flight position, the chord being substantially normal to the longitudinal axis when the retrofit central unit is attached to the aircraft and the supplemental wing is in the hover position, the supplemental wing being rotatable through a plurality of positions intermediate to the hover and forward flight positions;
 c. the supplemental wing defining a leading edge and a trailing edge, the supplemental wing defining a aerodynamic center and an angle of attack when a relative wind is moving over the supplemental wing from the leading edge to the trailing edge, the aerodynamic center being aft of the pitch axis when the retrofit central unit is attached to the aircraft and the aircraft is flying in the forward direction in the forward flight position so that a lift acting through the aerodynamic center applies a negative pitching moment to the supplemental wing when the aircraft is flying in the forward direction with the supplemental wing in the forward flight position;
 d. wherein the supplemental wing has an aerodynamic configuration to apply a positive pitching moment to the supplemental wing when the retrofit central unit is attached to the aircraft and the aircraft is flying in the forward direction with the supplemental wing in the forward flight position so that the supplemental wing rotates about the pitch axis to an equilibrium position in which the positive pitching moment balances the negative pitching moment;
 e. wherein the rotor has a control authority over the rotary wing aircraft in flight, the aircraft further comprising: a trim control system, the trim control system including an airspeed sensor to detect a speed of the relative wind over the supplemental wing from the leading edge to the trailing edge when the aircraft is flying in the forward direction and the supplemental wing is in the forward flight position, the trim control system including a movable trim control surface at the trailing edge of the supplemental wing, the trim control system having a configuration to depress the trim control surface when the aircraft is flying in the forward direction at greater than a predetermined speed so that the trim control surface increases the negative pitching moment of the supplemental wing and reduces the amount of lift generated by the supplemental wing, whereby the control authority of the rotor is preserved.

17. The retrofit supplemental wing of claim 16 wherein the aerodynamic configuration of the supplemental wing to apply a positive pitching moment that balances the negative pitching moment is that the wing defines a reflex camber airfoil.

18. The retrofit supplemental wing of claim 16 wherein the aerodynamic configuration of the wing to apply a positive pitching moment so that the positive pitching moment balances the negative pitching moment is the trim control system.

19. The retrofit supplemental wing of claim 18 wherein the supplemental wing is attached to the fuselage by a bearing, the supplemental wing being passively rotatable about the pitch axis with respect to the bearing between the forward flight and the hover positions and through the plurality of positions intermediate to the forward flight and hover positions.

20. The retrofit supplemental wing of claim 16 wherein the supplemental wing defines a wing spar, the wing spar is rotatably attached to the fuselage by a bearing, the wing defining a wing root, the wing root being attached to the wing spar, the supplemental wing being rotatable about the pitch axis with respect to the bearing between the forward flight and the hover positions and through the plurality of positions intermediate to the forward flight and hover positions, a friction of the wing spar with respect to the bearing resisting the rotation of the supplemental wing, the aircraft further comprising:
   a. a strain gauge, the strain gauge being configured to detect a sum of the positive pitching moment and negative pitching moment on the wing spar between the bearing and the wing root;
   b. a power assist actuator, the power assist actuator being operably attached to the strain gauge, the power assist actuator being configured to apply an actuator moment to the supplemental wing adequate to overcome the friction of the wing spar with respect to the bearing and to rotate the supplemental wing to the equilibrium position.

\* \* \* \* \*